(12) United States Patent
Hackert et al.

(10) Patent No.: US 10,233,112 B2
(45) Date of Patent: *Mar. 19, 2019

(54) LASER PROCESSING OF SLOTS AND HOLES

(71) Applicant: Corning Incorporated, Corning, NY (US)

(72) Inventors: Thomas Hackert, Germering (DE); Sasha Marjanovic, Painted Post, NY (US); Garrett Andrew Piech, Corning, NY (US); Sergio Tsuda, Horseheads, NY (US); Robert Stephen Wagner, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 15/251,605

(22) Filed: Aug. 30, 2016

(65) Prior Publication Data

US 2016/0368809 A1    Dec. 22, 2016

Related U.S. Application Data

(62) Division of application No. 14/536,009, filed on Nov. 7, 2014.

(Continued)

(51) Int. Cl.
*C03B 33/08* (2006.01)
*B23K 26/00* (2014.01)
(Continued)

(52) U.S. Cl.
CPC ........ *C03B 33/082* (2013.01); *B23K 26/0608* (2013.01); *B23K 26/0622* (2015.10);
(Continued)

(58) Field of Classification Search
CPC ... C03B 33/082; C03B 33/0222; C03B 33/04; B23K 26/53; B23K 26/55; B23K 26/0057; B23K 26/006; B23K 26/0608
See application file for complete search history.

(56) References Cited

U.S. PATENT DOCUMENTS 1,790,397 A    1/1931    Woods et al.
2,682,134 A    6/1956    Stookey
(Continued)

FOREIGN PATENT DOCUMENTS

CN    2388062 Y    7/2000
CN    1283409 C    11/2006
(Continued)

OTHER PUBLICATIONS

Kerr, "Filamentary tracks formed in transparent optical glass by laser beam self-focusing. II. Theoretical Analysis" Physical Review A, 4(3) Sep. 1971. pp. 1195-1218.
(Continued)

*Primary Examiner* — Jason L Lazorcik
(74) *Attorney, Agent, or Firm* — Kevin M. Able

(57) ABSTRACT

The present invention relates to a process for cutting and separating interior contours in thin substrates of transparent materials, in particular glass. The method involves the utilization of an ultra-short pulse laser to form perforation or holes in the substrate, that may be followed by use of a $CO_2$ laser beam to promote full separation about the perforated line.

18 Claims, 16 Drawing Sheets

Related U.S. Application Data

(60) Provisional application No. 61/917,148, filed on Dec. 17, 2013, provisional application No. 62/022,855, filed on Jul. 10, 2014.

(51) Int. Cl.

| | | |
|---|---|---|
| *B23K 26/06* | (2014.01) | |
| *B23K 26/0622* | (2014.01) | |
| *B23K 26/53* | (2014.01) | |
| *C03B 33/02* | (2006.01) | |
| *C03B 33/04* | (2006.01) | |
| *C03B 33/09* | (2006.01) | |
| *B23K 26/382* | (2014.01) | |
| *B23K 26/55* | (2014.01) | |
| *B23K 26/359* | (2014.01) | |
| *B23K 103/00* | (2006.01) | |

(52) U.S. Cl.
CPC .......... *B23K 26/359* (2015.10); *B23K 26/382* (2015.10); *B23K 26/389* (2015.10); *B23K 26/53* (2015.10); *B23K 26/55* (2015.10); *C03B 33/0222* (2013.01); *C03B 33/04* (2013.01); *C03B 33/091* (2013.01); *B23K 2103/54* (2018.08); *Y02P 40/57* (2015.11); *Y10T 428/15* (2015.01); *Y10T 428/24273* (2015.01)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachshon |
| 5,265,107 A | 11/1993 | Delfyett, Jr. |
| 5,314,522 A | 5/1994 | Kondo et al. |
| 5,400,350 A | 3/1995 | Galvanauskas |
| 5,434,875 A | 7/1995 | Rieger et al. |
| 5,436,925 A | 7/1995 | Lin et al. |
| 5,553,093 A | 9/1996 | Ramaswamy et al. |
| 5,574,597 A | 11/1996 | Kataoka et al. |
| 5,586,138 A | 12/1996 | Yokoyama |
| 5,656,186 A | 8/1997 | Mourou et al. |
| 5,684,642 A | 11/1997 | Zumoto et al. |
| 5,696,782 A | 12/1997 | Harter et al. |
| 5,736,709 A | 4/1998 | Neiheisel |
| 5,776,220 A | 7/1998 | Allaire et al. |
| 6,016,223 A | 1/2000 | Suzuki et al. |
| 6,016,324 A | 1/2000 | Rieger et al. |
| 6,038,055 A | 3/2000 | Hänsch et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,353,829 B1 | 4/2008 | Wachter et al. |
| 7,402,773 B2 | 7/2008 | Nomaru |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhao et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Plüss |
| 8,943,855 B2 | 2/2015 | Gomez et al. |
| 8,951,889 B2 | 2/2015 | Ryu et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |

(56) References Cited

U.S. PATENT DOCUMENTS

| | | |
|---|---|---|
| 9,327,381 B2 | 5/2016 | Lee et al. |
| 9,446,590 B2 | 9/2016 | Chen et al. |
| 9,481,598 B2 | 11/2016 | Bergh et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2004/0221615 A1 | 11/2004 | Postupack et al. |
| 2005/0024743 A1 | 2/2005 | Camy-Peyret |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2005/0277270 A1 | 12/2005 | Yoshikawa et al. |
| 2006/0011593 A1 | 1/2006 | Fukuyo |
| 2006/0109874 A1 | 5/2006 | Shiozaki et al. |
| 2006/0127679 A1 | 6/2006 | Gulati et al. |
| 2006/0227440 A1 | 10/2006 | Gluckstad |
| 2006/0266744 A1 | 11/2006 | Nomaru |
| 2006/0289410 A1 | 12/2006 | Morita et al. |
| 2007/0044606 A1 | 3/2007 | Kang et al. |
| 2007/0091977 A1 | 4/2007 | Sohn et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0079940 A1 | 4/2008 | Sezerman et al. |
| 2008/0099444 A1 | 5/2008 | Misawa et al. |
| 2008/0190981 A1 | 8/2008 | Okajima et al. |
| 2009/0013724 A1 | 1/2009 | Koyo et al. |
| 2009/0176034 A1 | 7/2009 | Ruuttu et al. |
| 2009/0183764 A1 | 7/2009 | Meyer |
| 2009/0199694 A1 | 8/2009 | Uh et al. |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0024865 A1 | 2/2010 | Shah et al. |
| 2010/0025387 A1 | 2/2010 | Arai et al. |
| 2010/0029460 A1 | 2/2010 | Shojiya et al. |
| 2010/0032087 A1 | 2/2010 | Takahashi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0326138 A1 | 12/2010 | Kumatani et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0139760 A1 | 6/2011 | Shah et al. |
| 2011/0183116 A1 | 7/2011 | Hung et al. |
| 2011/0240611 A1 | 10/2011 | Sandström et al. |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0196454 A1 | 8/2012 | Shah et al. |
| 2012/0216570 A1 | 8/2012 | Abramov et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fugii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0216573 A1 | 8/2013 | Trusheim et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0036338 A1 | 2/2014 | Bareman et al. |
| 2014/0042202 A1 | 2/2014 | Lee |
| 2014/0047957 A1 | 2/2014 | Wu |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Weigel et al. |
| 2014/0239034 A1 | 8/2014 | Cleary et al. |
| 2014/0290310 A1 | 10/2014 | Green |
| 2014/0320947 A1 | 10/2014 | Egerton et al. |
| 2014/0333929 A1 | 11/2014 | Sung et al. |
| 2014/0361463 A1 | 12/2014 | DeSimone et al. |
| 2015/0034612 A1 | 2/2015 | Hosseini et al. |
| 2015/0038313 A1 | 2/2015 | Hosseini |
| 2015/0060402 A1 | 3/2015 | Burkett et al. |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |

(56) References Cited

U.S. PATENT DOCUMENTS

| | | |
|---|---|---|
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0280580 A1 | 9/2016 | Bohme |
| 2016/0290791 A1 | 10/2016 | Buono et al. |
| 2016/0304386 A1 | 10/2016 | Dong et al. |
| 2017/0169847 A1 | 6/2017 | Tamaki |

FOREIGN PATENT DOCUMENTS

| | | |
|---|---|---|
| CN | 101502914 A | 8/2009 |
| CN | 201357287 Y | 12/2009 |
| CN | 101637849 A | 2/2010 |
| CN | 201471092 U | 5/2010 |
| CN | 102248302 A | 11/2011 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 104344202 A | 2/2015 |
| CN | 102672355 B | 5/2015 |
| DE | 2231330 A1 | 1/1974 |
| DE | 102006035555 A1 | 1/2008 |
| DE | 102012010635 A1 | 11/2013 |
| DE | 102012110971 A1 | 5/2014 |
| DE | 102013223637 A1 | 5/2015 |
| EP | 270897 A1 | 2/1992 |
| EP | 0609978 A1 | 8/1994 |
| EP | 656241 B1 | 12/1998 |
| EP | 938946 A1 | 9/1999 |
| EP | 949541 A2 | 10/1999 |
| EP | 1159104 B1 | 8/2004 |
| EP | 1609559 A1 | 12/2005 |
| EP | 1043110 B1 | 8/2006 |
| EP | 2133170 A1 | 12/2009 |
| EP | 2202545 A1 | 6/2010 |
| EP | 2574983 A1 | 4/2013 |
| EP | 2754524 B1 | 7/2014 |
| EP | 2781296 A1 | 9/2014 |
| EP | 2783784 A2 | 10/2014 |
| EP | 2859984 A2 | 4/2015 |
| FR | 2989294 A1 | 10/2013 |
| GB | 1242172 A | 8/1971 |
| GB | 2481190 B | 1/2015 |
| JP | 6246930 A | 2/1987 |
| JP | 1179770 A | 7/1989 |
| JP | 6318756 A | 11/1994 |
| JP | 19944318756 A | 11/1994 |
| JP | 3106243 A | 4/1997 |
| JP | 11197498 A | 7/1999 |
| JP | 1999197498 A | 7/1999 |
| JP | 11269683 A | 10/1999 |
| JP | 1999269683 A | 10/1999 |
| JP | 11330597 A | 11/1999 |
| JP | 1999330597 A | 11/1999 |
| JP | 11347758 A | 12/1999 |
| JP | 1999347758 A | 12/1999 |
| JP | 2001130921 A | 5/2001 |
| JP | 2001138083 A | 5/2001 |
| JP | 2002210730 A | 7/2002 |
| JP | 2002228818 A | 8/2002 |
| JP | 2003025085 A | 1/2003 |
| JP | 2003062756 A | 3/2003 |
| JP | 2003114400 A | 4/2003 |
| JP | 2003154517 A | 5/2003 |
| JP | 2003181668 A | 7/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005288503 A | 10/2005 |
| JP | 3775250 B2 | 5/2006 |
| JP | 3775410 B2 | 5/2006 |
| JP | 2006130691 A | 5/2006 |
| JP | 2006248885 A | 9/2006 |
| JP | 2007021548 A | 2/2007 |
| JP | 2007196277 A | 8/2007 |
| JP | 2007253203 A | 10/2007 |
| JP | 2009172633 A | 8/2009 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 2011517299 A | 6/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012187618 A | 10/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 2013091578 A | 5/2013 |
| JP | 5274085 B2 | 8/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2012015366 | 2/2002 |
| KR | 2009057161 | 6/2009 |
| KR | 1020621 | 3/2011 |
| KR | 1120471 B1 | 3/2012 |
| KR | 2012074508 | 7/2012 |
| KR | 2013031380 | 3/2013 |
| KR | 1269474 | 5/2013 |
| KR | 2013124646 | 11/2013 |
| KR | 1344368 | 12/2013 |
| KR | 2014022980 | 2/2014 |
| KR | 2014022981 | 2/2014 |
| KR | 2014064220 | 5/2014 |
| KR | 20150009153 A | 1/2015 |
| TW | 201139025 A | 11/2011 |
| TW | 201226345 | 7/2012 |
| WO | 1999029243 A1 | 7/1999 |
| WO | 1999063900 A1 | 12/1999 |
| WO | 2004110693 A1 | 12/2004 |
| WO | 2006073098 A1 | 7/2006 |
| WO | 2007094160 A1 | 8/2007 |
| WO | 2008049389 A1 | 5/2008 |
| WO | 2008080182 A1 | 7/2008 |

(56) References Cited

FOREIGN PATENT DOCUMENTS

| WO | 2008128612 A1 | 10/2008 |
|---|---|---|
| WO | 2009114375 A2 | 9/2009 |
| WO | 2009119694 A1 | 10/2009 |
| WO | 2010035736 A1 | 4/2010 |
| WO | 2010111609 A2 | 9/2010 |
| WO | 2010129459 A2 | 11/2010 |
| WO | 2011025908 A1 | 3/2011 |
| WO | 2011056781 A1 | 5/2011 |
| WO | 2012006736 A2 | 1/2012 |
| WO | 2012075072 A2 | 6/2012 |
| WO | 2012108052 A1 | 8/2012 |
| WO | 2012166753 A1 | 12/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014028022 A1 | 2/2014 |
| WO | 2014064492 A1 | 5/2014 |
| WO | 2014079478 A1 | 5/2014 |
| WO | 2014079570 A1 | 5/2014 |
| WO | 2014085663 A1 | 6/2014 |
| WO | 2014111385 A1 | 7/2014 |
| WO | 2014111794 A1 | 7/2014 |
| WO | 2014161534 A2 | 10/2014 |
| WO | 2014161535 A2 | 10/2014 |
| WO | 2015077113 A1 | 5/2015 |
| WO | 2015095088 A1 | 6/2015 |
| WO | 2015095090 A1 | 6/2015 |
| WO | 2015095146 A1 | 6/2015 |
| WO | 2015127583 A1 | 9/2015 |
| WO | 2016005455 A1 | 1/2016 |
| WO | 2016010954 A2 | 1/2016 |
| WO | 2016154284 A1 | 9/2016 |
| WO | 2017091529 A1 | 6/2017 |

OTHER PUBLICATIONS

Abramov et al., "Laser separation of chemically strengthened glass", Physics Procedia, 5 (2010), 285-290.
Bagchi et al; "Fast ion beams from intense, femtosecond laser irradiated nanostructured surfaces"; Appl. Phys. B 88, 167-173, (2007).
Bhuyan et al; "Laser micro- and nanostructuring using femtosecond Bessel beams"; Eur. Phys. J. Special Topics, 199, 101-110 (2011).
Bhuyan et al; "Single-shot high aspect ratio bulk nanostructuring of fused silica using chirp-controlled ultrafast laser Bessel beams"; Applied Physics Letters, 104, 021107 (2014).
Bhuyan et al; "Ultrafast Bessel beams for high aspect ratio taper free micromachining of glass"; Proc. of SPIE, vol. 7728, 77281V-2-77281V-8.
Courvoisier et al; "Applications of femtosecond Bessel beams to laser ablation"; Appl Phys A (2013) 112:29-34.
Courvoisier et al; "Surface nanoprocessing with nondiffracting femtosecond Bessel beams"; Optics Letters, vol. 34, No. 20, 2009, 3163-3165.
D. Zeng, et al., Characteristic Analysis of a Refractive Axicon System for Optical Trepanning; Optical Engineering 45(9), 094302 Sep. 2006.
Design of Diffractivephase Axicon Illuminated by a Gaussian-Profile Beam, Zhangg Uo-Qing, D Ongb I-Zhen,Y Angg Uo-Zhen, and Gu Ben-Yuan, vol. 6, No. 5 Acta Physica Sinica May 1996, pp. 354.
E. Vanagas et al., "Glass Cutting by Femtosecond Pulsed Radiation", J. Microlith., Microfa., Microsyst., 3(2) 358-363, 2004.
Herman, et al., "Laser Micromachining of 'transparent' fused silica with 1ps pulses and pulse trains", SPIE Conference, San Jose, CA, Jan. 1999, vol. 3616-0277-786X/99.
High-Resolution Optical Coherence Tomography Over a Large Depth Range With an Axicon Lens, Zhihua Ding, Hongwu Ren, Yonghua Zhao, J. Stuart Nelson, and Zhongping Chen, Feb. 15, 2002 / vol. 27, No. 4 / Optics Letters 243.
http://www.gtat.com/collateral/documents/english-us/sapphire/12-21-12_gt_touchscreen_v3_web.pdf.
Ilya Golub, Fresnel Axicon, 1890 Optics Letters / vol. 31, No. 12 / Jun. 15, 2006.
Kruger, et al., "Laser micromachining of barium aluminum borosilicate glass with pulse durations between 20 fs and 3 ps,", Applied Surface Science, 127-129(1998), 892-898.
M. K. Bhuyan, et al., High Aspect Ratio Nanochannel Machining Using Single Shot Femtosecond Bessel Beams, Appl. Phys. Lett. 97, 081102 (2010).
M. K. Bhuyan, et al., High Aspect Ratio Taper-Free Microchannel Fabrication Using Femtosecond Bessel Beams, Jan. 18, 2010 / vol. 18, No. 2 / Optics Express 566.
O.G. Kosareva, et al. Formation of extended plasma channels in a condensed medium upon axicon focusing of a femtosecond laser pulse, Quantum Electronics, 35(11), 1013-1014 (2005).
Pavel Polynkin, et al., Extended filamentation with temporally chirped femtosecond Bessel-Gauss beams in air, Jan. 19, 2009 / vol. 17, No. 2 / Optics Express 575.
Perry, et al., "Ultrashort-Pulse Laser Machining," submitted to ICA of Lasers and Electro-Optics, Preprint Nov. 16-19, 1998, Pub. Jan. 22, 1999, International Congress on Applications of Lasers and Electro-Optics.
Rieko Arimoto, et al., Imaging Properties of Axicon in a Scanning Optical System; Nov. 1, 1992 / Vol. 31, No. 31 / Applied Optics 6653.
Stoian et al; "Spatial and temporal laser pulse design for material processing on ultrafast scales"; Appl. Phys. A (2014) 114:119-127.
Sundaram et al; "Inducing and Probing Non-Thermal Transistions in Semiconductors Using Femtosecond Laser Pulses"; Nature Materials; vol. 1 2002; 217-224.
Velpula et al; "Ultrafast imaging of free carriers: controlled excitation with chirped ultrafast laser Bessel beams"; Proc of SPIE vol. 8967, 896711-1-896711-8.
Yoshino, et al., "Micromachining with a High Repetition Rate Femtosecond Fiber Laser," Journal of laser Micro/Nanoengineering vol. 3, No. 3, 2008.
"What is the difference between Ra and RMS?"; Harrison Electropolishing LP; (http://www.harrisonep.com/electropolishing-ra.html); Accessed Aug. 8, 2016.
Case Design Guidelines for Apple Devices Release R5 (http://web.archive.org/web/20131006050442/http://developer.apple.com/resources/cases/Case-Design-Guidelines.pdf; archived on Oct. 6, 2013).
Dong et al.; On-axis irradiance distribution of axicons illuminated by spherical wave; Optics & Laser Technology 39 (2007) 1258-1261.
Toytoman et al.; "Optical breakdown in transparent media with adjustable axial length and location"; Optics Express vol. 18 No. 24 (2010), 24688-24698.
Singapore Patent Application No. 11201605864R Search Report dated May 24, 2017, 10 Pages; Intellecutal Property of Office of Singapore.
Abakians, H. et al.; Evaporative Cutting of a Semitransparent Body With a Moving CW Laser; Journal of Heat Transfer; Nov. 1988; pp. 924-930; vol. 110; ASME.
Ahmed, F. et al.; Display glass cutting by femtosecond laser induced single shot periodic void array; Applied Physics A Material Science & Processing; Jun. 3, 2008; pp. 189-192; vol. 93; Springer-Verlag.
Bagchi, S. et al.; Fast ion beams from intense, femtosecond laser irradiated nanostructured surfaces; Applied Physics B Lasers and Optics; Jun. 27, 2007; pp. 167-173; vol. 88; Springer-Verlag.
Bhuyan, M.K. et al.; Femtosecond non-diffracting Bessel beams and controlled nanoscale ablation; ResearchGate Conference Paper; Sep. 2011; pp. 1-4.
Bhuyan, M. K. et al.; Laser micro- and nanostructuring using femtosecond Bessel beams; The European Physical Journal Special Topics; Dec. 7, 2011; pp. 101-110; vol. 1999; EDP Sciences, Springer-Verlag.
Bhuyan, M.K. et al.; Single-shot high aspect ratio bulk nanostructuring of fused silica using chirp-controlled ultrafast laser Bessel

(56) References Cited

OTHER PUBLICATIONS beams; Applied Physics Letters; Jan. 14, 2014; pp. 021107-1-021107-4; vol. 104; AIP Publishing LLC.
Bhuyan, M.K. et al.; Ultrafast Bessel beams for high aspect ratio taper free micromachining of glass; Nonlinear Optics and Applications IV; 2010; pp. 77281V-1-77281V-8; vol. 7728; SPIE.
Case Design Guidelines for Apple Devices; Sep. 13, 2013; pp. 1-58; Apple Inc.
Chiao, R. Y. et al.; Self-Trapping of Optical Beams; Physical Review Letters; Oct. 12, 1964; pp. 479-482; vol. 13, No. 15.
Corning EAGLE AMLCD Glass Substrates Material Information; Apr. 2005; pp. MIE 201-1-MIE 201-3; Corning Incorporated.
Corning 1737 AMLCD Glass Substrates Material Information; Aug. 2002; pp. MIE 101-1-MIE 101-3; Corning Incorporated.
Couairon, A. et al.; Femtosecond filamentation in transparent media; ScienceDirect Physical Reports; Feb. 6, 2007; pp. 47-189; vol. 441; Elsevier B.V.
Courvoisier, F. et al.; Applications of femtosecond Bessel beams to laser ablation; Applied Physics A Materials Science & Processing; Sep. 6, 2012; pp. 29-34; vol. 112; Springer-Verlag.
Courvoisier, F. et al.; Surface nanoprocessing with nondiffracting femtosecond Bessel beams; Optics Letters; Oct. 15, 2009; pp. 3163-3165; vol. 34, No. 20; Optical Society of America.
Dong, M. et al.; On-axis irradiance distribution of axicons illuminated by spherical wave; ScienceDirect Optics & Laser Technology; Sep. 2007; pp. 1258-1261; vol. 39; Elsevier Ltd.
Duocastella, M. et al.; Bessel and annular beams for materials processing; Laser & Photonics Reviews; 2012; pp. 607-621; vol. 6, No. 5.
Durnin, J.; Exact solutions for nondiffracting beams. I. The scalar theory; J. Opt. Soc. Am. A; Apr. 1987; pp. 551-654; vol. 4, No. 4; Optical Society of America.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
Gattass, R. et al.; Micromachining of bulk glass with bursts of femtosecond laser pulses at variable repetition rates; Optics Express; Jun. 12, 2006; pp. 5279-5284; vol. 14, No. 12; Optical Society of America.
Gori, F. et al.; Analytical derivation of the optimum triplicator; Optics Communications; Dec. 1, 1998; pp. 13-16; vol. 157; Elsevier B.V.
Honda, M. et al.; A Novel Polymer Film that Controls Light Transmission; Progress in Pacific Polymer Science 3; 1994; pp. 159-169; Springer-Verlag Berlin Heidelberg.
Hu, Z. et al.; 5-Axis Laser Cutting Interference Detection and Correction Based on STL Model; Chinese Journal of Lasers; Dec. 2009; pp. 3313-3317; vol. 36, No. 12.
Huang, Z. et al.; Laser etching of glass substrates by 1064 nm laser irradiation; Applied Physics A Materials Science & Processing; Jun. 6, 2008; pp. 159-163; vol. 93; Springer-Verlag.
Juodkazis, S. et al.; Laser-Induced Microexplosion Confined in the Bulk of a Sapphire Crystal: Evidence of Multimegabar Pressures; Physical Review Letters; Apr. 28, 2006; pp. 166101-1-166101-4; vol. 96; The American Physical Society.
Karlsson, S. et al.; The Technology of Chemical Glass Strengthening—A Review; Glass Technology—European Journal of Glass Science and Technology Part A; Apr. 2010; pp. 41-54; vol. 51, No. 2.
Levy, U. et al.; Design, fabrication, and characterization of circular Dammann gratings based on grayscale lithography; Optics Letters; Mar. 15, 2010; pp. 880-882; vol. 35, No. 6; Optical Society of America.
Liu, X. et al.; Laser Ablation and Micromachining with Ultrashort Laser Pulses; IEEE Journal of Quantum Electronics; Oct. 1997; p. 1706-1716; vol. 33, No. 10; IEEE.

Maeda, K et al.; Optical performance of angle dependent light control glass; Optical Materials Technology for Energy Efficiency and Solar Energy Conversion X; 1991; pp. 138-148; vol. 1536; SPIE.
Mbise, G. et al.; Angular selective window coatings; theory and experiments; J. Phys. D: Appl. Phys.; 1997; pp. 2103-2122; vol. 30; IOP Publishing Ltd.
McGloin, D. et al.; Bessel beams: diffraction in a new light; Contemporary Physics; Jan.-Feb. 2005; pp. 15-28; vol. 46; Taylor & Francis Ltd.
Merola, F. et al.; Characterization of Bessel beams generated by polymeric microaxicons; Measurement Science and Technology; May 15, 2012; pp. 1-10; vol. 23; IOP Publishing Ltd.
Mirkhalaf, M. et al.; Overcoming the brittleness of glass through bio-inspiration and micro-architecture; Nature Communications; Jan. 28, 2014; pp. 1-9; Macmillan Publishers Limited.
Romero, L. et al.; Theory of optimal beam splitting by phase gratings. II. Square and hexagonal gratings; J. Opt. Soc. Am. A; Aug. 2007; pp. 2296-2312; vol. 24, No. 8; Optical Society of America.
Salleo, A. et al.; Machining of transparent materials using an IR and UV nanosecond pulsed laser; Applied Physics A Materials Science & Processing; Sep. 20, 2000; pp. 601-608; vol. 71; Springer-Verlag.
Serafetinides, A. et al.; Polymer Ablation by Ultra-Short Pulsed Lasers; Proceedings of SPIE; 2000; pp. 409-415.
Shah, L. et al.; Micromachining with a High Repetition Rate Femtosecond Fiber Laser; JLMN—Journal of Laser Micro/Nanoengineering; Nov. 2008; pp. 157-162; vol. 3, No. 3.
Shealy, D. et al.; Geometric optics-based design of laser beam shapers; Opt. Eng.; Nov. 2003; pp. 3123-3138; vol. 42, No. 11; Society of Photo-Optical Instrumentation Engineers.
Stoian, R. et al.; Spatial and temporal laser pulse design for material processing on ultrafast scales; Applied Physics A Materials Science & Processing; Jan. 1, 2014; pp. 119-127; vol. 114; Springer-Verlag Berlin Heidelberg.
Thiele, E.; Relation between Catalytic Activity and Size of Particle; Industrial and Engineering Chemistry; Jul. 1939; pp. 916-920; vol. 31, No. 7.
Toytman, I. et al.; Optical breakdown in transparent media with adjustable axial length and location; Optic Express; Nov. 22, 2010; pp. 24688-24698; vol. 18, No. 24; Optical Society of America.
Velpula, P. et al.; Ultrafast imaging of free carriers: controlled excitation with chirped ultrafast laser Bessel beams; Laser Applications in Microelectronic and Optoelectronic Manufacturing (LAMOM) XIX; Proc. of SPIE; 2014; pp. 896711-1-896711-8; vol. 8967; SPIE.
Wang Z. et al.; Investigation on CO2 laser irradiation inducing glass strip peeling for microchannel formation; Biomicrofluidics; Mar. 12, 2012; pp. 012820-1-012820-12; vol. 6; American Institute of Physics.
Ra & RMS: Calculating Surface Roughness; Harrison Eelectropolishing; 2012.
Wu, W. et al.; Optimal Orientation of the Cutting Head for Enhancing Smoothness Movement in Three-Dimensional Laser Cutting; Chinese Journal of Lasers; Jan. 2013; pp. 0103005-1-0103005-7, vol. 10, No. 1.
GT ASF Grown Sapphire Cover and Touch Screen Material; www.gtat.com; 2012; pp. 1-2; GTAT Corporation.
Xu, H. et al.; Optimization of 3D laser cutting head orientation based on minimum energy consumption; Int J Adv Manuf Technol; Jun. 28, 2014; pp. 1283-1291; vol. 74; Springer-Verlag London.
Yan, Y. et al.; Fiber structure to convert a Gaussian beam to higher-order optical orbital angular momentum modes; Optics Letters; Aug. 15, 2012; pp. 3294-3296; vol. 37, No. 16; Optical Society of America.
Abramov et al., "Laser separation of chemically strengthened glass"; Physics Procedia 5 (2010) 285-290, Elsevier.; doi: 10.1016/j.phpro.2010.08.054.
Arimoto et al., "Imaging properties of axicon in a scanning optical system"; Applied Optics, Nov. 1, 1992, vol. 31, No. 31, pp. 6653-6657.
"TruMicro 5000" Product Manual, Trumpf Laser GmbH + Co. KG, pp. 1-4, Aug. 2011.

(56) References Cited

OTHER PUBLICATIONS

Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
Cubeddu et al., "Compact tissue oximeter based on dual-wavelength multichannel time-resolved reflectance"; Applied Optics, vol. 38, No. 16, Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
"EagleEtch" Product Brochure, EuropeTec USA Inc., pp. 1-8, Aug. 1, 2014.
Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 (1997), pp. 882-884.
Golub, I., "Fresnel axicon"; Optic Letters, vol. 31, No. 12, Jun. 15, 2006, Optical Society of America, pp. 1890-1892.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Krüger et al., "Femtosecond-pulse visible laser processing of transparent materials"; Applied Surface Science 96-98 (1996) 430-438.
Krüger et al., "Laser micromachining of barium aluminium borosilicate glass with pluse durations between 20 fs and 3 ps"; Applied Surface Science 127-129 (1998) 892-898.
Krüger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physics A 69 [Suppl.], S883-S886, Springer-Verlag (1999); doi: 10.1007/s003399900300.
Perry et al., "Ultrashort-pulse laser machining"; UCRL-JC-132159 Rev 1., Jan. 22, 1999, pp. 1-24.
Perry et al., "Ultrashort-pulse laser machining"; UCRL-ID-132159, Sep. 1998, pp. 1-38.
Perry et al., "Ultrashort-pulse laser machining of dielectric materials"; Journal of Applied Physics, vol. 85, No. 9, May 1, 1999, American Institute of Physics, pp. 6803-6810.
"PHAROS High-power femtosecond laser system" product brochure; Light Conversion, Vilnius, LT; Apr. 18, 2011, pp. 1-2.
Polynkin et al., "Extended filamentation with temporally chirped femtosecond Bessel-Gauss beams in air"; Optics Express, vol. 17, No. 2, Jan. 19, 2009, OSA, pp. 575-584.
Serafetinides et al., "Ultra-short pulsed laser ablation of polymers"; Applied Surface Science 180 (2001) 42-56.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.

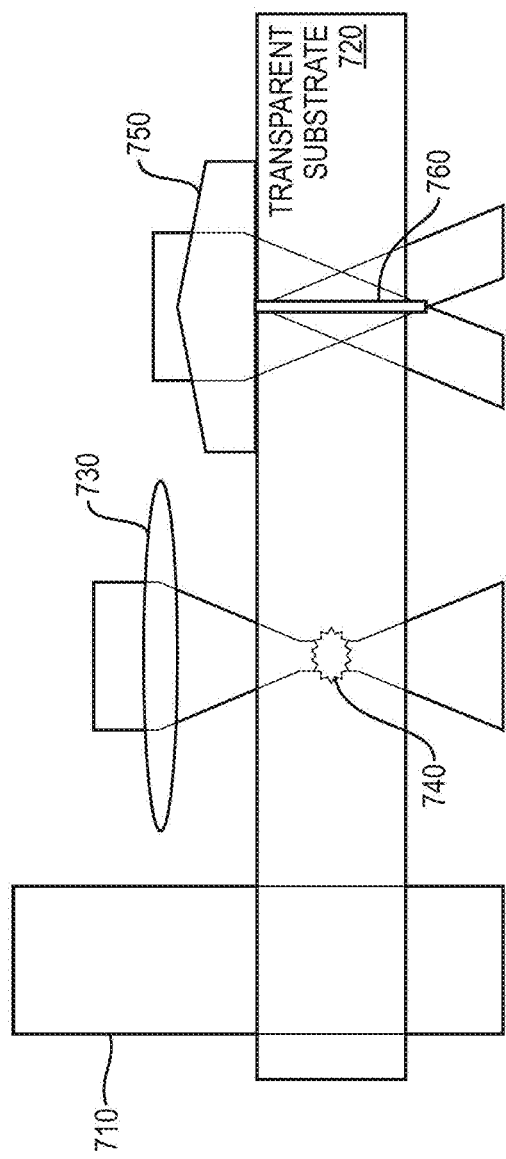

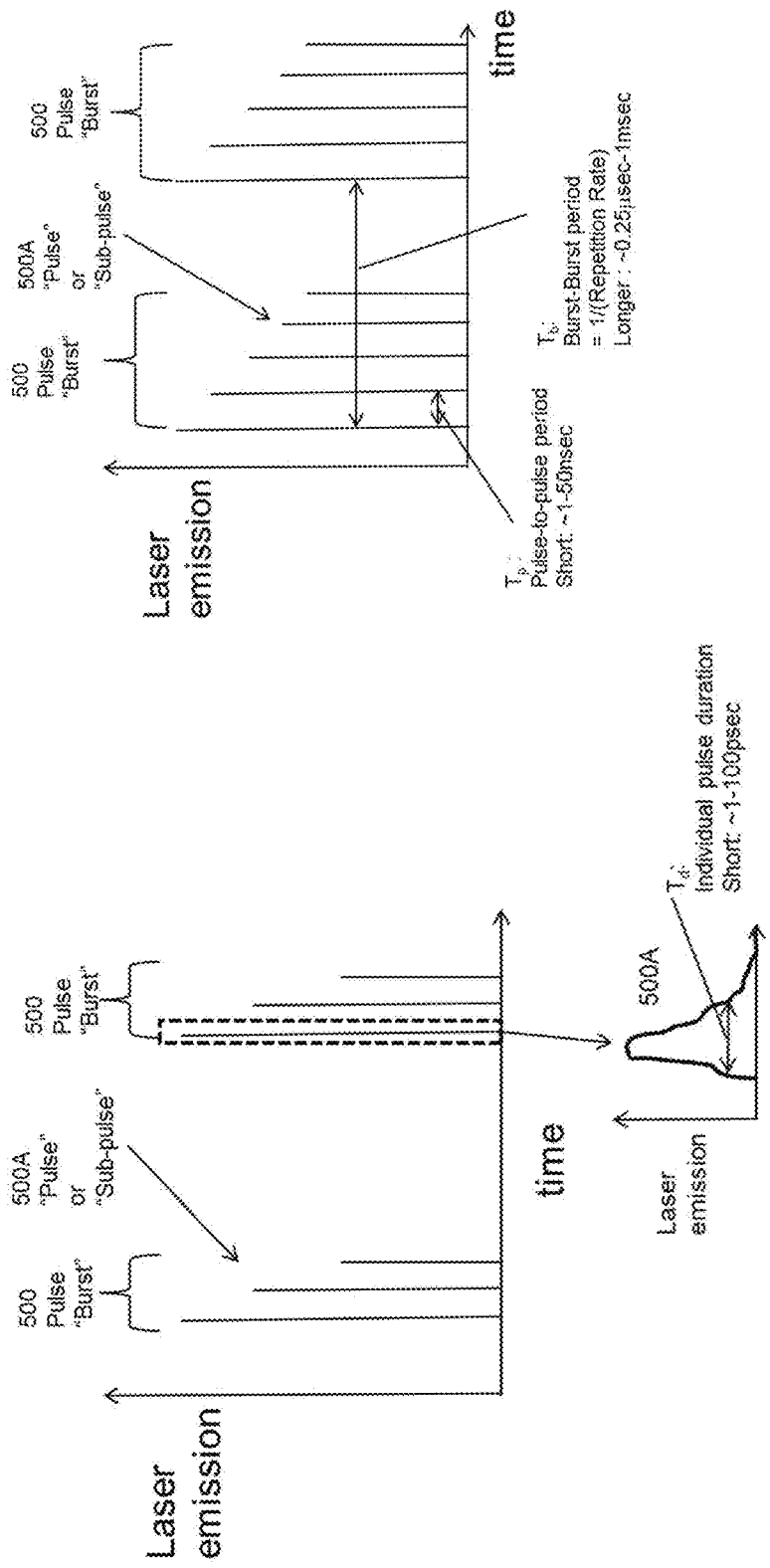

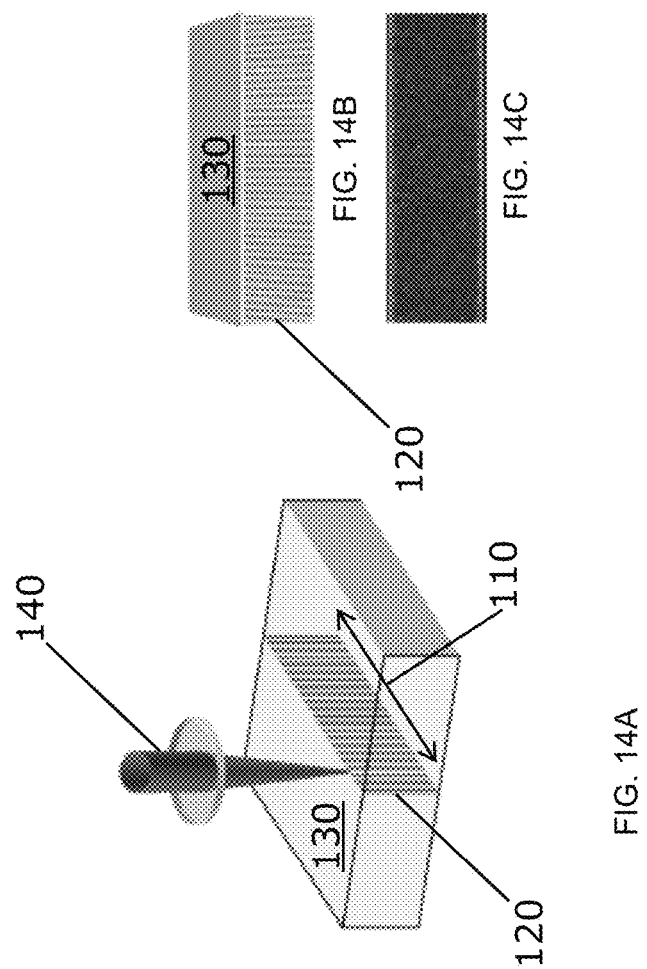

LASER PROCESSING OF SLOTS AND HOLES

RELATED APPLICATION(S)

This application is a divisional of U.S. patent application Ser. No. 14/536,009 filed on Nov. 7, 2014, which claims the benefit of U.S. Provisional Application No. 61/917148 filed on Dec. 17, 2013 and U.S. Provisional Application No. 62/022855 filed on Jul. 10, 2014. The entire teachings of these applications are incorporated herein by reference.

BACKGROUND

The cutting of holes and slots in thin substrates of transparent materials, such as glass, can be accomplished by focused laser beams that are used to ablate material along the contour of a hole or slot, where multiple passes are used to remove layer after layer of material until the inner plug no longer is attached to the outer substrate piece. The problem with such processes is that they require many passes (dozens or even more) of the laser beam to remove the material layer by layer, they generate significant ablative debris which will contaminate the surfaces of the part, and they generate a lot of subsurface damage (>100 µm) along the edge of the contour.

Therefore, there is a need for an improved process for cutting holes and slots.

SUMMARY

Embodiments described herein relate to a process for cutting and separating interior contours in thin substrates of transparent materials, in particular glass.

In one embodiment, a method of laser drilling a material includes focusing a pulsed laser beam into a laser beam focal line, viewed along the beam propagation direction, directing the laser beam focal line into the material at a first location, the laser beam focal line generating an induced absorption within the material, the induced absorption producing a hole along the laser beam focal line within the material, translating the material and the pulsed laser beam relative to each other starting from the first location along a first closed contour, thereby laser drilling a plurality of holes along the first closed contour within the material, translating the material and the pulsed laser beam relative to each other starting from the first location along a first closed contour, thereby laser drilling a plurality of holes along the first closed contour within the material, and directing a carbon dioxide (CO2) laser into the material around a second closed contour contained within the first closed contour to facilitate removal of an inner plug of the material along the first closed contour.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3B-1 thru 3B-4 is an illustration of various possibilities to process the substrate by differently positioning the laser beam focal line relative to the substrate.

FIG. 4 is an illustration of a second optical assembly for laser drilling.

FIG. 7A-7C is an illustration of different regimes for laser processing of materials. FIG. 7A illustrates an unfocused laser beam, FIG. 7B illustrates a condensed laser beam with a spherical lens, and FIG. 7C illustrates a condensed laser beam with an axicon or diffractive Fresnel lens.

FIG. 8A illustrates schematically the relative intensity of laser pulses within an exemplary pulse burst vs. time, with each exemplary pulse burst having 3 pulses.

FIG. 8B illustrates schematically relative intensity of laser pulses vs. time within an exemplary pulse burst, with each exemplary pulse burst containing 5 pulses.

FIGS. 14A-14C are illustrations of a fault line (or perforated line) with equally spaced defect lines or damage tracks of modified glass.

DETAILED DESCRIPTION

A description of example embodiments follows.

Disclosed herein is a process for cutting and separating interior contours in thin substrates of transparent materials, in particular glass. The method involves the utilization of an ultra-short pulse laser to form perforation or holes in the substrate, that may be followed by use of a $CO_2$ laser beam to promote full separation about the perforated line. The laser process described below generates full body cuts of a variety of glasses in a single pass, with low sub-surface damage (<75 um), and excellent surface roughness (Ra<0.5 um). Sub-surface damage (SSD) is defined as the extent of cracks or "checks" perpendicular to the cut edge of the glass piece. The magnitude of the distance these cracks extend into the glass piece can determine the amount of later material removal that may be needed from grinding and polishing operations that are used to improve glass edge strength. SSD may be measured by using confocal microscope to observed light scattering from the cracks, and determining the maximum distance the cracks extend into the body of the glass over a given cut edge.

Figure 1:
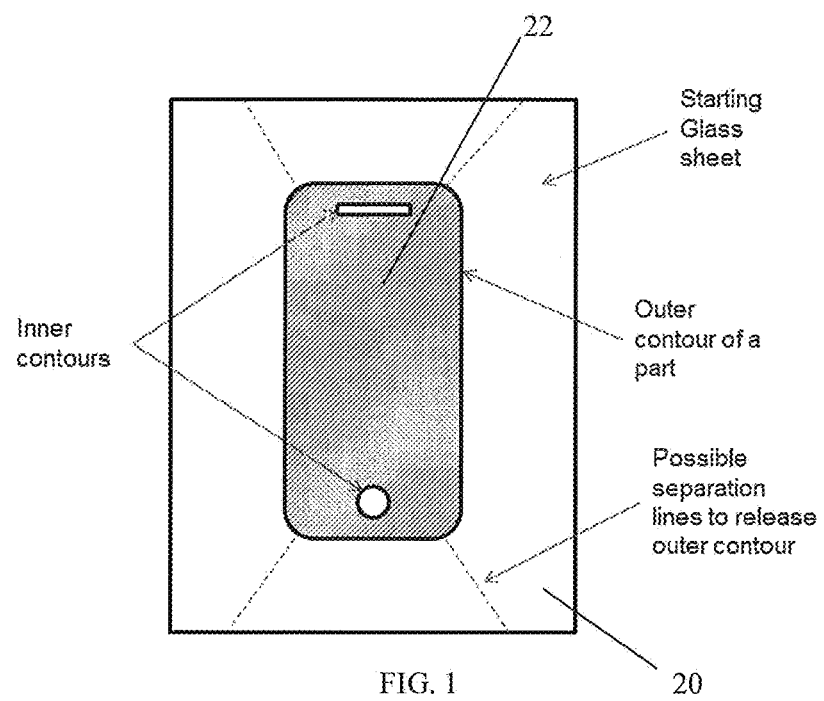
FIG. 1 is an illustration of a part to be cut out of a starting sheet. The part has both outer and inner contours. The outer contour can be easily released from the mother sheet by adding in additional cuts or "release lines."

One embodiment relates a method to cut and separate interior contours in materials such as glass, with a separation process that exposes the high quality edge generated by the above-mentioned perforation process without damaging it by the separation process. When a part is cut out of a starting sheet of substrate, it may be comprised of outer or inner contours, as shown in FIG. 1. Release of outer contour the part from the sheet can be done by adding additional cut lines known as "release lines", as shown in FIG. 1. However, for the interior contours, no release lines can be made, as they would mar the part of interest. In some cases, for the highly stressed materials and large enough interior contours, the inner part may self-separate and fall out. However, for small holes and slots (e.g., 10 mm holes, slots of widths <few mm, for example ≤3 mm, or ≤2 mm, or even ≤1 mm), even for stressed materials, the inner part will not fall out. A hole is generally defined as a circular, or substantially circular feature in crossection. In contrast, slots are generally have highly elliptical features, such as features that have aspect ratios (e.g., cross-sectional or as viewed from the top or bottom, for example) of length to width of >4:1, typically ≥5:1, for example 1.5 mm×15 mm, or 3 mm×15 mm, or 1 mm×10 mm, or 1.5 mm by 7 mm, etc. Slots may have radiused corners, or the corners may be sharp (90 degree) features.

The challenge with separating an interior contour, such as a hole in a glass piece required for the "home" or power button on a smart phone, is that even if the contour is well perforated and a crack propagates around it, the inner plug of material may be under compressive pressure and locked in place by the material surrounding the plug. This means that the challenging part is an automated release process that allows the plug to drop out. This problem occurs regardless of whether or not the material to be cut is high stress and easy to form cracks in, like in the case of a chemically strengthened glass substrate like Gorilla® Glass, or if the material is low stress, like in the case of Eagle XG® glass. A high stress glass is a glass having central (in the center of the thickness of the glass) tension greater than about 24 MPa; while a low stress glass typically has a central tension less than about 24 MPa.

The present application is generally directed to a laser method and apparatus for precision cutting and separation of arbitrary shapes out of glass substrates in a controllable fashion, with negligible debris and minimum damage to part edges that preserves strength. The developed laser method relies on the material transparency to the laser wavelength in linear regime, or low laser intensity, which allows maintenance of a clean and pristine surface quality and on the reduced subsurface damage created by the area of high intensity around the laser focus. One of the key enablers of this process is the high aspect ratio of the defect created by the ultra-short pulsed laser. It allows creation of a fault line that extends from the top to the bottom surfaces of the material to be cut. In principle, this defect can be created by a single laser pulse and if necessary, additional pulses can be used to increase the extension of the affected area (depth and width).

Using a short pulse picosecond laser and optics which generate a focal line, a closed contour is perforated in a glass sheet. The perforations are less than a few microns in diameter, typical spacing of the perforations is 1-15 µm, and the perforations go entirely through the glass sheet.

To generate a weak point to facilitate material removal, an additional contour could then be optionally perforated with the same process a few hundred microns to the interior of the first contour.

A focused $CO_2$ laser beam, of a high enough power density to ablate the glass material, is then traced around the second contour, causing the glass material to fragment and be removed. One or more passes of the laser may be used. A high pressure assist gas is also forced out through a nozzle collinearly to the $CO_2$ beam, to provide additional force to drive the glass material out of the larger glass piece.

The method to cut and separate transparent materials is essentially based on creating a fault line on the material to be processed with an ultra-short pulsed laser. Depending on the material properties (absorption, CTE, stress, composition, etc.) and laser parameters chosen for processing that determined material, the creation of a fault line alone can be enough to induce self-separation. This is the case for most strengthened glasses (those that have already undergone ion-exchange before cutting) that have significant (i.e., greater than about 24 MPa) internal or central tension (CT). In this case, no secondary separation processes, such as tension/bending forces or $CO_2$ laser, are necessary.

In some cases, the created fault line is not enough to separate the glass automatically. This is often the case for display glasses such as Eagle XG®, Lotus, or ion-exchangeable glasses that are cut before any ion-exchange step. Thus, a secondary process step may be necessary. If so desired, a second laser can be used to create thermal stress to separate it, for example. In the case of Corning code 2320 NIOX (non-ion exchanged Gorilla® Glass 3), we have found that separation can be achieved, after the creation of a defect line, by application of mechanical force or by tracing the existing fault line with an infrared $CO_2$ laser beam to create thermal stress and force the parts to self-separate. Another option is to have the $CO_2$ laser only start the separation and finish the separation manually. The optional $CO_2$ laser separation is achieved with a defocused (i.e. spot size at the glass of 2-12 mm in diameter) continuous wave laser emitting at 10.6 µm and with power adjusted by controlling its duty cycle. Focus change (i.e., extent of defocusing) is used to vary the induced thermal stress by varying the spot size. After generation of the perforation lines, $CO_2$ induced separation can generally be achieved by using a power at the glass of ~40 W, a spot size of about 2 mm, and a traverse rate of the beam of ~14-20 m/minute.

However, even if the glass has enough internal stress to start self-separation after the formation of the defect line, the geometry of the cut contour may prevent an interior glass part from releasing. This is the case for most closed or inner contours, such as simple holes or slots. The interior portion of the aperture will remain in place due to the compression forces present in the glass sheet—the cracks may propagate between the perforated defects, but no room exists to allow the piece to fall out of the mother sheet.

Forming the Defect or Perforation Line

For the first process step, there are several methods to create that defect line. The optical method of forming the line focus can take multiple forms, using donut shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached to create breakdown of the substrate material. This wavelength may be, for example, 1064, 532, 355 or 266 nanometers.

Ultra-short pulse lasers can be used in combination with optics that generate a focal line to fully perforate the body of a range of glass compositions. In some embodiments, the pulse duration of the individual pulses is in a range of between greater than about 1 picoseconds and less than about 100 picoseconds, such as greater than about 5 picoseconds and less than about 20 picoseconds, and the repetition rate of the individual pulses can be in a range of between about 1 kHz and 4 MHz, such as in a range of between about 10 kHz and 650 kHz.

In addition to a single pulse operation at the aforementioned individual pulse repetition rates, the pulses can be produced in bursts of two pulses, or more (such as, for example, 3 pulses, 4, pulses, 5 pulses, 10 pulses, 15 pulses, 20 pulses, or more) separated by a duration between the individual pulses within the pulse burst that is in a range of between about 1 nsec and about 50 nsec, for example, 10-50 nsec, or 10 to 30 nsec, such as about 20 nsec, and the burst repetition frequency can be in a range of between about 1 kHz and about 200 kHz. (Bursting or producing pulse bursts is a type of laser operation where the emission of pulses is not in a uniform and steady stream but rather in tight clusters of pulses.) The pulse burst laser beam can have a wavelength selected such that the material is substantially transparent at this wavelength. The average laser power per burst measured at the material can be greater than 40 microJoules per mm thickness of material, for example between 40 microJoules/mm and 2500 microJoules/mm, or between 200 and 800 microJoules/mm. For example, for 0.5 mm-0.7 mm thick Corning 2320 non-ion exchanged glass one may use 200 µJ pulse bursts to cut and separate the glass, which gives an exemplary range of 285-400 µJ/mm. The glass is moved relative to the laser beam (or the laser beam is translated relative to the glass) to create perforated lines that trace out the shape of any desired parts.

The laser creates hole-like defect zones (or damage tracks, or defect lines) that penetrate the full depth the glass, with internal openings, for example of approximately 1 micron in diameter. These perforations, defect regions, damage tracks, or defect lines are generally spaced from 1 to 15 microns apart (for example, 2-12 microns, or 3-10 microns). The defect lines extend, for example, through the thickness of the glass sheet, and are orthogonal to the major (flat) surfaces of the glass sheet.

In one embodiment, an ultra-short (~10 psec) burst pulsed laser is used to create this high aspect ratio vertical defect line in a consistent, controllable and repeatable manner. The detail of the optical setup that enables the creation of this vertical defect line is described below and in U.S. Application No. 61/752,489, filed on Jan. 15, 2013. The essence of this concept is to use an axicon lens element in an optical lens assembly to create a region of high aspect ratio taper-free microchannel using ultra-short (picoseconds or femtosecond duration) Bessel beams. In other words, the axicon condenses the laser beam into a region of cylindrical shape and high aspect ratio (long length and small diameter). Due to the high intensity created with the condensed laser beam, nonlinear interaction of the laser electromagnetic field and the material occurs and the laser energy is transferred to the substrate. However, it is important to realize that in the areas where the laser energy intensity is not high (i.e., glass surface, glass volume surrounding the central convergence line), nothing happens to the glass as the laser intensity is below the nonlinear threshold.

Figures 2A, 2B:
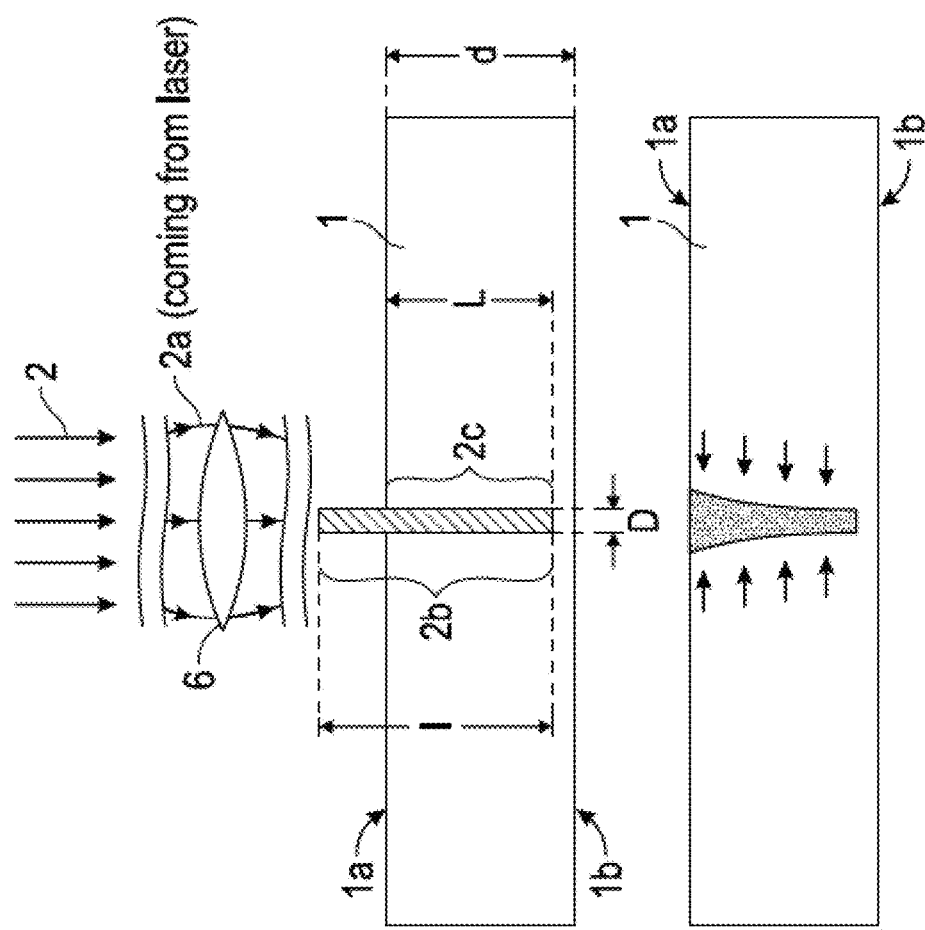
FIGS. 2A and 2B are illustrations of positioning of the laser beam focal line, i.e., the processing of a material transparent for the laser wavelength due to the induced absorption along the focal line.

Turning to FIGS. 2A and 2B, a method of laser drilling a material includes focusing a pulsed laser beam 2 into a laser beam focal line 2b, viewed along the beam propagation direction. As shown in FIG. 3, laser 3 (not shown) emits laser beam 2, at the beam incidence side of the optical assembly 6 referred to as 2a, which is incident on the optical assembly 6. The optical assembly 6 turns the incident laser beam into an extensive laser beam focal line 2b on the output side over a defined expansion range along the beam direction (length l of the focal line). The planar substrate 1 to be processed is positioned in the beam path after the optical assembly overlapping at least partially the laser beam focal line 2b of laser beam 2. Reference 1a designates the surface of the planar substrate facing the optical assembly 6 or the laser, respectively, reference lb designates the reverse surface of substrate 1 usually spaced in parallel. The substrate thickness (measured perpendicularly to the planes 1a and 1b, i.e., to the substrate plane) is labeled with d.

As FIG. 2A depicts, substrate 1 is aligned perpendicularly to the longitudinal beam axis and thus behind the same focal line 2b produced by the optical assembly 6 (the substrate is perpendicular to the drawing plane) and viewed along the beam direction it is positioned relative to the focal line 2b in such a way that the focal line 2b viewed in beam direction starts before the surface la of the substrate and stops before the surface lb of the substrate, i.e. still within the substrate. In the overlapping area of the laser beam focal line 2b with substrate 1, i.e. in the substrate material covered by focal line 2b, the extensive laser beam focal line 2b thus generates (in case of a suitable laser intensity along the laser beam focal line 2b which is ensured due to the focusing of laser beam 2 on a section of length l, i.e. a line focus of length l) an extensive section 2c viewed along the longitudinal beam direction, along which an induced absorption is generated in the substrate material which induces a defect line or crack formation in the substrate material along section 2c. The crack formation is not only local, but over the entire length of the extensive section 2c of the induced absorption. The length of section 2c (i.e., after all, the length of the overlapping of laser beam focal line 2b with substrate 1) is labeled with reference L. The average diameter or the average extension of the section of the induced absorption (or the sections in the material of substrate 1 undergoing the crack formation) is labeled with reference D. This average extension D basically corresponds to the average diameter δ of the laser beam focal line 2b, that is, an average spot diameter in a range of between about 0.1 µm and about 5 µm.

As FIG. 2A shows, substrate material transparent for the wavelength λ of laser beam 2 is heated due to the induced absorption along the focal line 2b. FIG. 2B outlines that the warming material will eventually expand so that a correspondingly induced tension leads to micro-crack formation, with the tension being the highest at surface 1a.

Concrete optical assemblies 6, which can be applied to generate the focal line 2b, as well as a concrete optical setup, in which these optical assemblies can be applied, are described below. All assemblies or setups are based on the description above so that identical references are used for identical components or features or those which are equal in their function. Therefore only the differences are described below.

As the parting face eventually resulting in the separation is or must be of high quality (regarding breaking strength, geometric precision, roughness and avoidance of re-machining requirements), the individual focal lines to be positioned on the substrate surface along parting line 5 should be generated using the optical assembly described below (hereinafter, the optical assembly is alternatively also referred to as laser optics). The roughness results particularly from the spot size or the spot diameter of the focal line. In order to achieve a low spot size of, for example, 0.5 µm to 2 µm in case of a given wavelength λ of laser 3 (interaction with the material of substrate 1), certain requirements must usually be imposed on the numerical aperture of laser optics 6. These requirements are met by laser optics 6 described below.

In order to achieve the required numerical aperture, the optics must, on the one hand, dispose of the required opening for a given focal length, according to the known Abbé formulae (N.A.=n sin (theta), n: refractive index of the glass to be processes, theta: half the aperture angle; and theta=arctan (D/2f); D: aperture, f: focal length). On the other hand, the laser beam must illuminate the optics up to the required aperture, which is typically achieved by means of beam widening using widening telescopes between laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

Figure 3A:
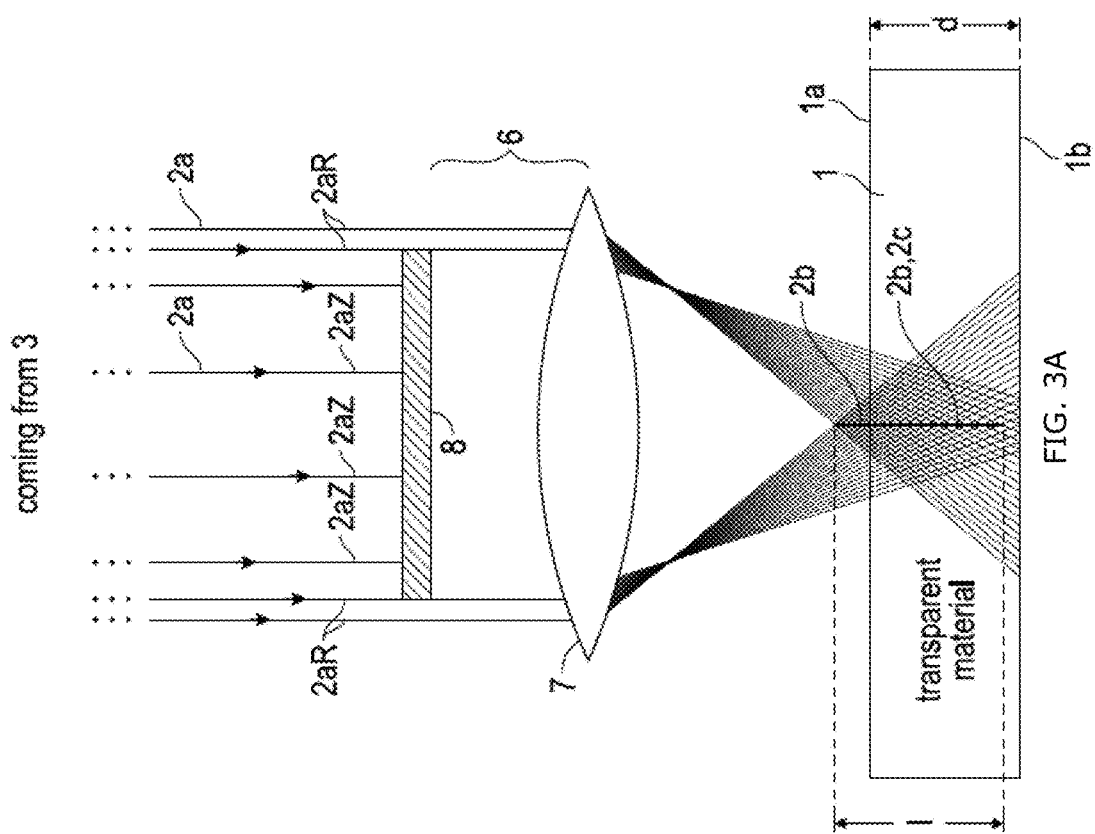
FIG. 3A is an illustration of an optical assembly for laser drilling.

According to FIG. 3A (section perpendicular to the substrate plane at the level of the central beam in the laser beam bundle of laser radiation 2; here, too, the center of the laser beam 2 is preferably perpendicularly incident to the substrate plane, i.e. angle is 0° so that the focal line 2b or the extensive section of the induced absorption 2c is parallel to the substrate normal), the laser radiation 2a emitted by laser 3 is first directed onto a circular aperture 8 which is completely opaque for the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it. Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which is designed as a spherically cut, bi-convex lens 7 here.

Lens 7 centered on the central beam is deliberately designed as a non-corrected, bi-convex focusing lens in the form of a common, spherically cut lens. Put another way, the spherical aberration of such a lens is deliberately used. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (beam bundle diameter defined by the extension to the decrease to 1/e$^2$) (intensity) and approximately 75% of the diameter of the lens of the optical assembly 6. The focal line 2b of a non- aberration-corrected spherical lens 7 generated by blocking out the beam bundles in the center is thus used. FIG. 3A shows the section in one plane through the central beam, the complete three-dimensional bundle can be seen when the depicted beams are rotated around the focal line 2b.

One disadvantage of this focal line is that the conditions (spot size, laser intensity) along the focal line, and thus along the desired depth in the material, vary and therefore the desired type of interaction (no melting, induced absorption, thermal-plastic deformation up to crack formation) may possibly only be selected in a part of the focal line. This means in turn that possibly only a part of the incident laser light is absorbed in the desired way. In this way, the efficiency of the process (required average laser power for the desired separation speed) is impaired on the one hand, and on the other hand the laser light might be transmitted into undesired deeper places (parts or layers adherent to the substrate or the substrate holding fixture) and interact there in an undesirable way (heating, diffusion, absorption, unwanted modification).

Figures 1, 3B:
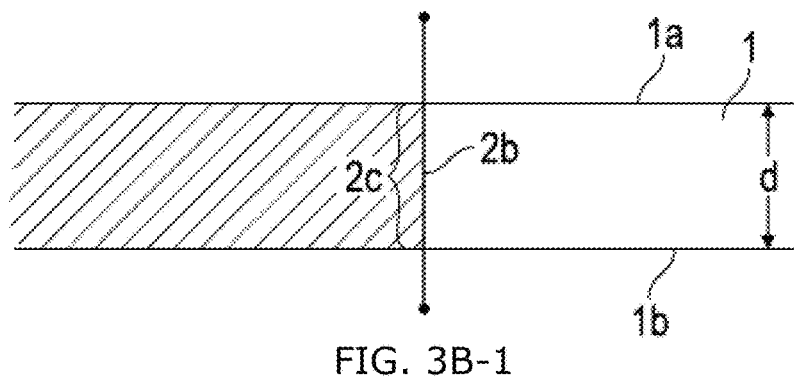
Figures 2, 3B:
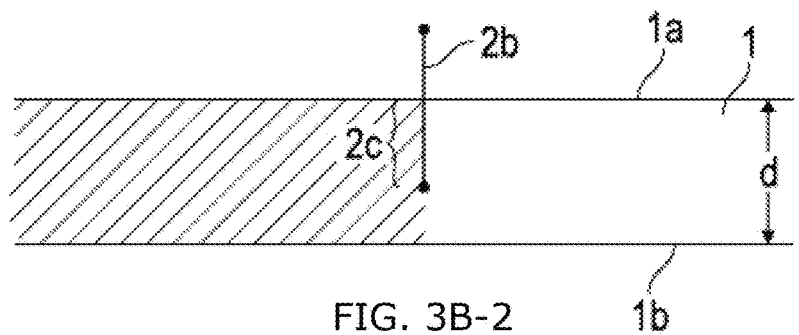
Figures 3, 3B:
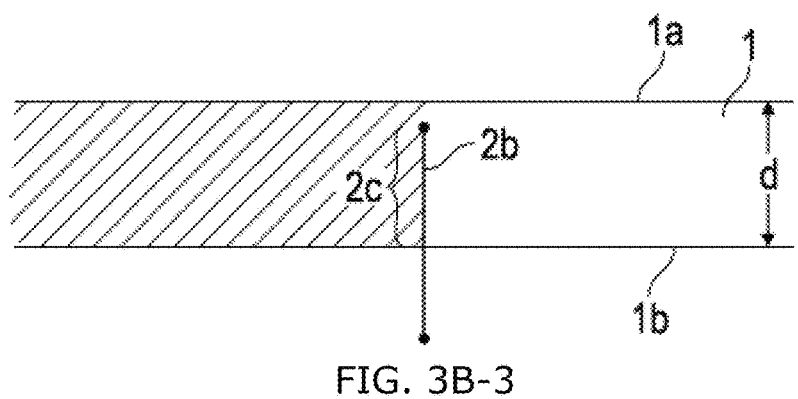
Figures 3, 3B, 4:
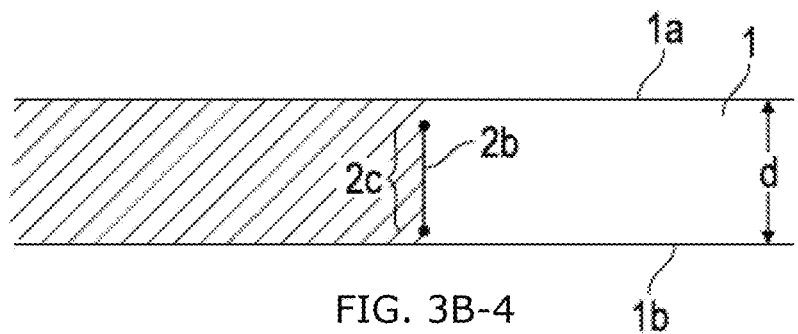
Figure 4:
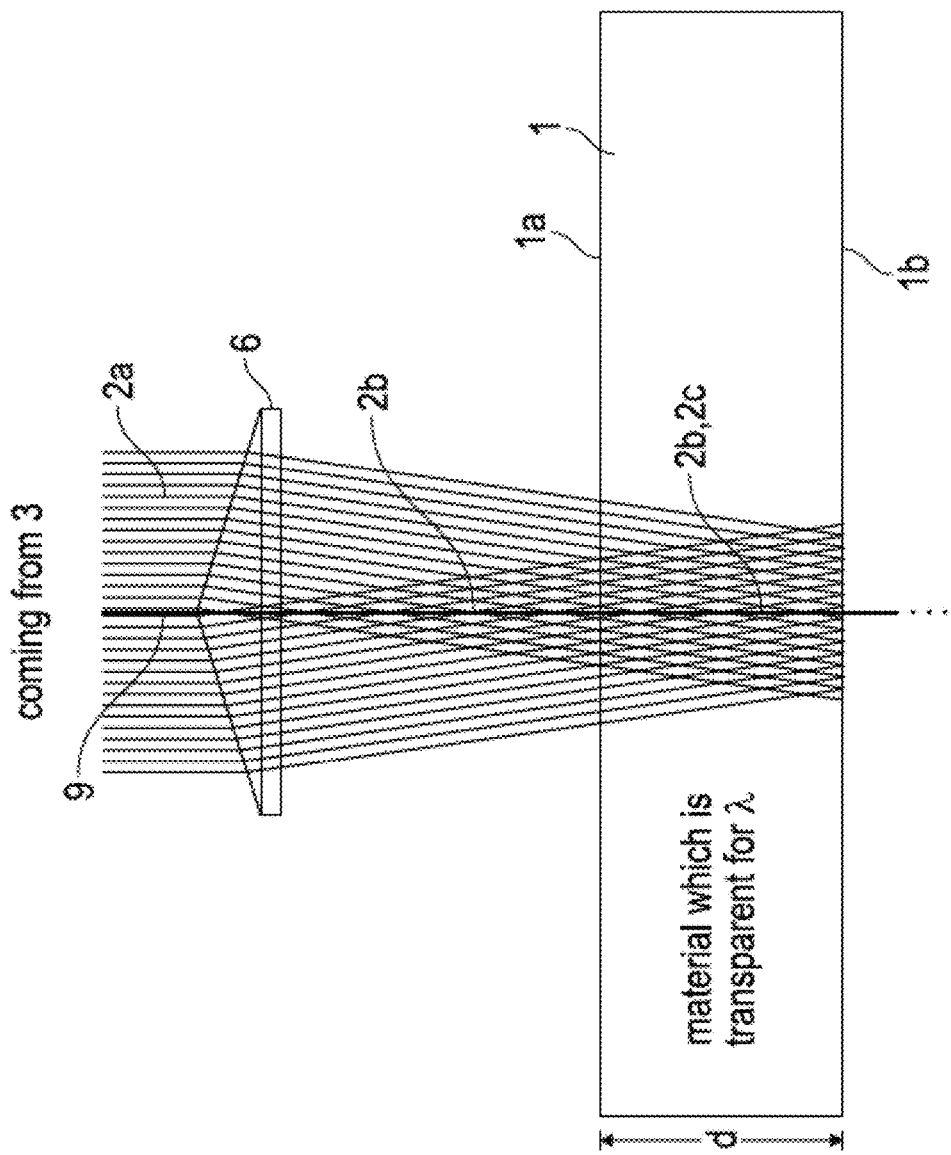

FIG. 3B-1-4 show (not only for the optical assembly in FIG. 3A, but basically also for any other applicable optical assembly 6) that the laser beam focal line 2b can be positioned differently by suitably positioning and/or aligning the optical assembly 6 relative to substrate 1 as well as by suitably selecting the parameters of the optical assembly 6: As FIG. 3B-1 outlines, the length l of the focal line 2b can be adjusted in such a way that it exceeds the substrate thickness d (here by factor 2). If substrate 1 is placed (viewed in longitudinal beam direction) centrally to focal line 2b, an extensive section of induced absorption 2c is generated over the entire substrate thickness.

In the case shown in FIG. 3B-2, a focal line 2b is generated which has a length l which is substantially the same as the substrate thickness d. As substrate 1 relative to line 2 is positioned in such a way that line 2b starts in a point before, i.e. outside the substrate, the length L of the extensive section of induced absorption 2c (which extends here from the substrate surface to a defined substrate depth, but not to the reverse surface 1b) is smaller than the length l of focal line 2b. FIG. 3B-3 shows the case in which the substrate 1 (viewed along the beam direction) is partially positioned before the starting point of focal line 2b so that, here too, it applies to the length l of line 2b l>L (L=extension of the section of induced absorption 2c in substrate 1). The focal line thus starts within the substrate and extends over the reverse surface 1b to beyond the substrate. FIG. 3B-4 finally shows the case in which the generate focal line length l is smaller than the substrate thickness d so that—in case of a central positioning of the substrate relative to the focal line viewed in the direction of incidence—the focal line starts near the surface 1a within the substrate and ends near the surface 1b within the substrate (l=0.75·d).

It is particularly advantageous to realize the focal line positioning in such a way that at least one surface 1a, 1b is covered by the focal line, i.e. that the section of induced absorption 2c starts at least on one surface. In this way it is possible to achieve virtually ideal cuts avoiding ablation, feathering and particulation at the surface.

FIG. 4 depicts another applicable optical assembly 6. The basic construction follows the one described in FIG. 3A so that only the differences are described below. The depicted optical assembly is based upon the use of optics with a non-spherical free surface in order to generate the focal line 2b, which is shaped in such a way that a focal line of defined length l is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is principally known to one of skill in the art; the cone angle in the example is 10°. The apex of the axicon labeled here with reference 9 is directed towards the incidence direction and centered on the beam center. As the focal line 2b of the axicon 9 already starts in its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon without leaving the range of focal line 2b. The extensive section of the induced absorption 2c in the material of substrate 1 therefore extends over the entire substrate thickness d.

However, the depicted layout is subject to the following restrictions: As the focal line of axicon 9 already starts within the lens, a significant part of the laser energy is not focused into part 2c of focal line 2b, which is located within the material, in case of a finite distance between lens and material. Furthermore, length l of focal line 2b is related to the beam diameter for the available refraction indices and cone angles of axicon 9, which is why, in case of relatively thin materials (several millimeters), the total focal line is too long, having the effect that the laser energy is again not specifically focused into the material.

Figure 5A:
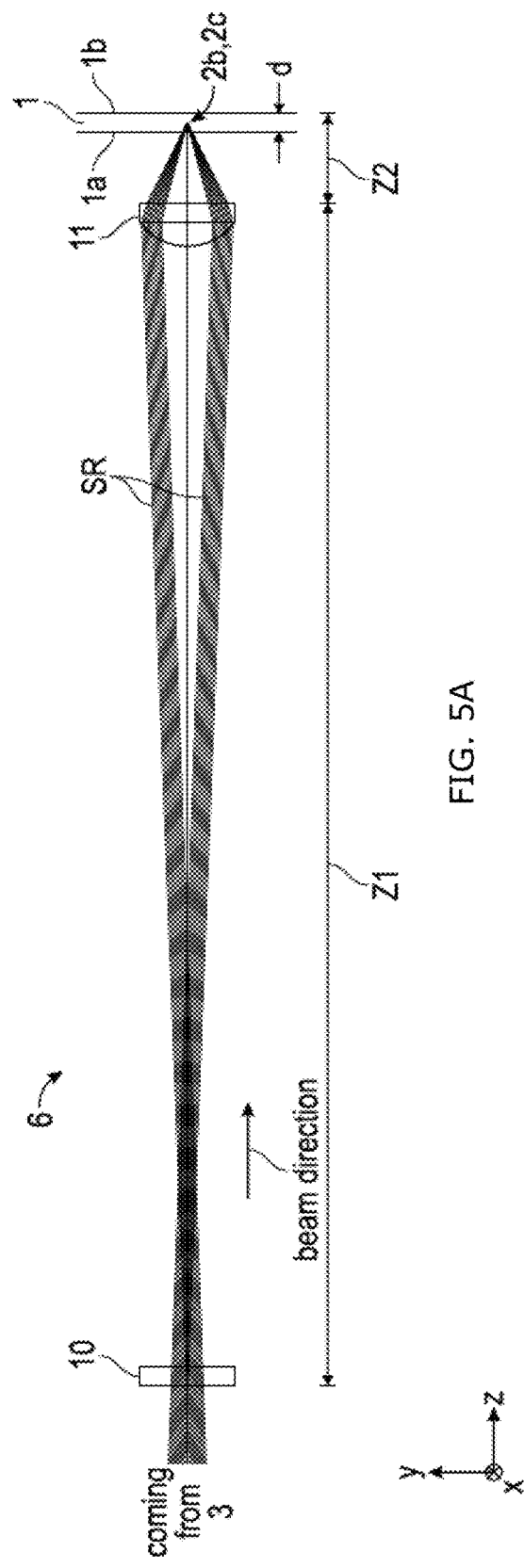
FIGS. 5A and 5B are illustrations of a third optical assembly for laser drilling.

This is the reason for an enhanced optical assembly 6 which comprises both an axicon and a focusing lens. FIG. 5A depicts such an optical assembly 6 in which a first optical element (viewed along the beam direction) with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in beam direction at a distance z1 from the axicon 10. The distance z1, in this case approximately 300 mm, is selected in such a way that the laser radiation formed by axicon 10 circularly incides on the marginal area of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm here. The circular transformation of the laser beam by axicon 10 is labeled with the reference SR.

Figure 5B:
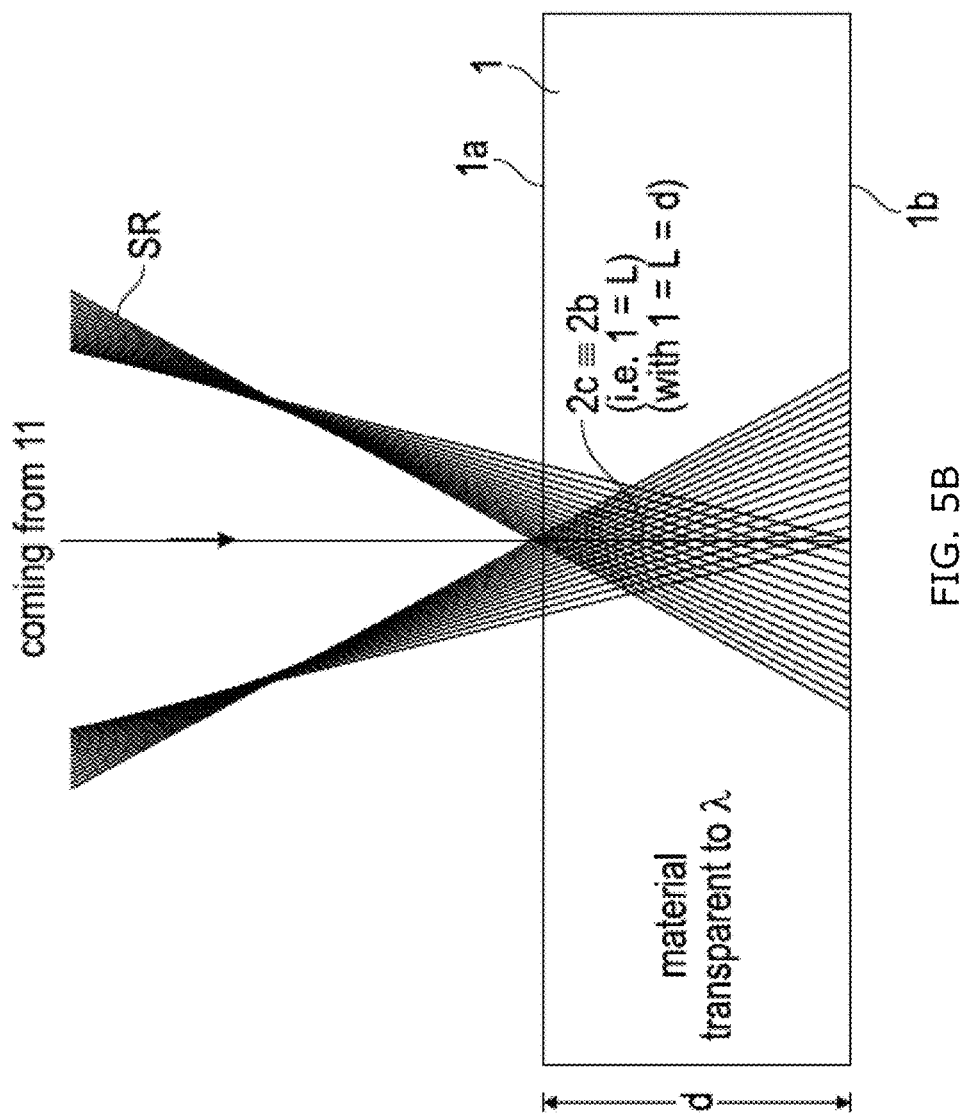

FIG. 5B depicts the formation of the focal line 2b or the induced absorption 2c in the material of substrate 1 according to FIG. 5A in detail. The optical characteristics of both elements 10, 11 as well as the positioning of them is selected in such a way that the extension 1 of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly on a required zone, which, on the one hand, serves to realize the required numerical aperture and thus the required spot size, on the other hand, however, the circle of diffusion diminishes in intensity after the required focal line 2b over a very short distance in the center of the spot, as a basically circular spot is formed. In this way, the crack formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length l of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the crack formation (i.e., defect line) is supposed to continue to the emergence side of the substrate, the circular illumination still has the advantage that, on the one hand, the laser power is used in the best possible way as a large part of the laser light remains concentrated in the required length of the focal line, on the other hand, it is possible to achieve a uniform spot size along the focal line—and thus a uniform separation process along the focal line—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam inciding on the axicon. This has the practical disadvantage that the centering of the beam onto the apex of the axicon must be very precise and that therefore the result is very sensitive to direction variations of the laser (beam drift stability). Furthermore, a tightly collimated laser beam is very divergent, i.e. due to the light deflection the beam bundle becomes blurred over short distances.

Figure 6:
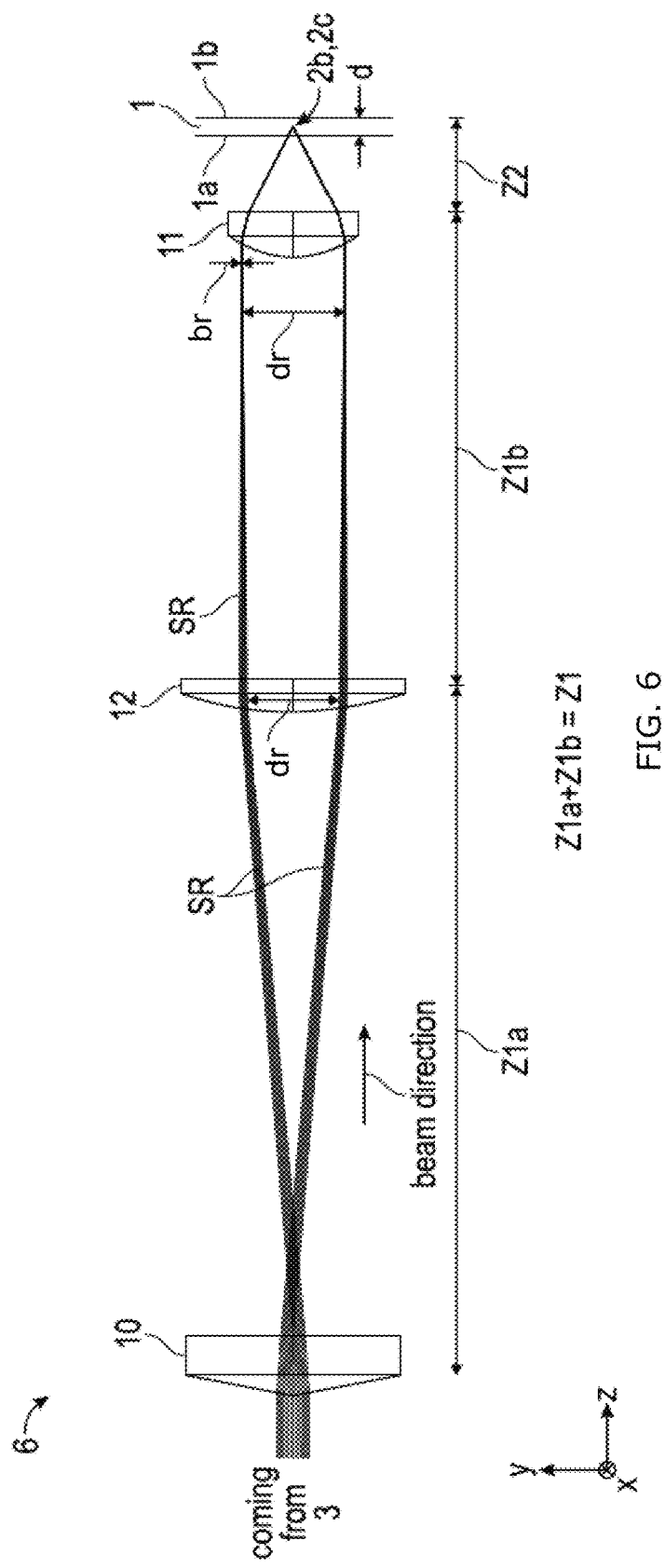
FIG. 6 is a schematic illustration of a fourth optical assembly for laser drilling.

As shown in FIG. 6, both effects can be avoided by inserting another lens, a collimating lens 12: this further, positive lens 12 serves to adjust the circular illumination of focusing lens 11 very tightly. The focal length f' of collimating lens 12 is selected in such a way that the desired circle diameter dr results from distance z1a from the axicon to the collimating lens 12, which is equal to f'. The desired width br of the ring can be adjusted via the distance z1b (collimating lens 12 to focusing lens 11). As a matter of pure geometry, the small width of the circular illumination leads to a short focal line. A minimum can be achieved at distance f'.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the generated focal line 2b from the focusing lens 11 as z2 (always viewed in beam direction). As shown in FIG. 6, the circular radiation SR formed by axicon 10, which incides divergently and under the circle diameter dr on the collimating lens 12, is adjusted to the required circle width br along the distance z1b for an at least approximately constant circle diameter dr at the focusing lens 11. In the case shown, a very short focal line 2b is supposed to be generated so that the circle width br of approx. 4 mm at lens 12 is reduced to approx. 0.5 mm at lens 11 due to the focusing properties of lens 12 (circle diameter dr is 22 mm in the example).

In the depicted example it is possible to achieve a length of the focal line 1 of less than 0.5 mm using a typical laser beam diameter of 2 mm, a focusing lens 11 with a focal length f=25 mm, and a collimating lens with a focal length f'=150 mm. Furthermore applies Z1a=Z1b=140 mm and Z2=15 mm.

FIGS. 7A-7C illustrate the laser-matter interaction at different laser intensity regimes. In the first case, shown in FIG. 7A, the unfocused laser beam 710 goes through a transparent substrate 720 without introducing any modification to it. In this particular case, the nonlinear effect is not present because the laser energy density (or laser energy per unit area illuminated by the beam) is below the threshold necessary to induce nonlinear effects. The higher the energy density, the higher is the intensity of the electromagnetic field. Therefore, as shown in FIG. 7B when the laser beam is focused by spherical lens 730 to a smaller spot size, as shown in FIG. 7B, the illuminated area is reduced and the energy density increases, triggering the nonlinear effect that will modify the material to permit formation of a fault line only in the volume where that condition is satisfied. In this way, if the beam waist of the focused laser is positioned at the surface of the substrate, modification of the surface will occur. In contrast, if the beam waist of the focused laser is positioned below the surface of the substrate, nothing happens at the surface when the energy density is below the threshold of the nonlinear optical effect. But at the focus 740, positioned in the bulk of the substrate 720, the laser intensity is high enough to trigger multi-photon non-linear effects, thus inducing damage to the material. Finally, as shown in FIG. 7C in the case of an axicon, as shown in FIG. 7C, the diffraction pattern of an axicon lens 750, or alternatively a Fresnel axicon, creates interference that generates a Bessel-shaped intensity distribution (cylinder of high intensity 760) and only in that volume is the intensity high enough to create nonlinear absorption and modification to the material 720. The diameter of cylinder 760, in which Bessel-shaped intensity distribution is high enough to create nonlinear absorption and modification to the material, is also the spot diameter of the laser beam focal line, as referred to herein. Spot diameter D of a Bessel beam can be expressed as $D=(2.4048\lambda)/(2\pi B)$, where $\lambda$ is the laser beam wavelength and B is a function of the axicon angle.

Note that typical operation of such a picosecond laser described herein creates a "burst" 500 of pulses 500A. (See, for example, FIGS. 8A and 8B). Each "burst" (also referred to herein as a "pulse burst" 500) contains multiple individual pulses 500A (such as at least 2 pulses, at least 3 pulses, at least 4 pulses, at least 5 pulses, at least 10 pulses, at least 15 pulses, at least 20 pulses, or more) of very short duration. That is, a pulse bust is a "pocket" of pulses, and the bursts are separated from one another by a longer duration than the separation of individual adjacent pulses within each burst. Pulses 500A have pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or therebetween). The energy or intensity of each individual pulse 500A within the burst may not be equal to that of other pulses within the burst, and the intensity distribution of the multiple pulses within a burst 500 often follows an exponential decay in time governed by the laser design. Preferably, each pulse 500A within the burst 500 of the exemplary embodiments described herein is separated in time from the subsequent pulse in the burst by a duration $T_p$ from 1 nsec to 50 nsec (e.g. 10-50 nsec, or 10-30 nsec, with the time often governed by the laser cavity design). For a given laser, the time separation $T_p$ between adjacent pulses (pulse-to-pulse separation) within a burst 500 is relatively uniform (±10%). For example, in some embodiments, each pulse within a burst is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or about ±2 nsec. The time between each "burst" of pulses (i.e., time separation $T_b$ between bursts) will be much longer (e.g., $0.25 \leq T_b \leq 1000$ microseconds, for example 1-10 microseconds, or 3-8 microseconds). In some of the exemplary embodiments of the laser described herein the time separation $T_b$ is around 5 microseconds for a laser with pulse burst repetition rate or frequency of about 200 kHz. The laser burst repetition rate is relates to the time $T_b$ between the first pulse in a burst to the first pulse in the subsequent burst (laser burst repetition rate=$1/T_b$). In some embodiments, the laser burst repetition frequency may be in a range of between about 1 kHz and about 4 MHz. More preferably, the laser burst repetition rates can be, for example, in a range of between about 10 kHz and 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50k Hz burst repetition rate). The exact timings, pulse durations, and burst repetition rates can vary depending on the laser design, but short pulses ($T_d$<20 psec and preferably $T_d \leq 15$ psec) of high intensity have been shown to work particularly well.

The energy required to modify the material can be described in terms of the burst energy—the energy contained within a burst (each burst 500 contains a series of pulses 500A), or in terms of the energy contained within a single laser pulse (many of which may comprise a burst). For these applications, the energy per burst can be from 25-750 μJ, more preferably 50-500 μJ, or 50-250 μJ. In some embodiments the energy per burst is 100-250 μJ. The energy of an individual pulse within the pulse burst will be less, and the exact individual laser pulse energy will depend on the number of pulses 500A within the pulse burst 500 and the rate of decay (e.g., exponential decay rate) of the laser pulses with time as shown in FIGS. 8A and 8B. For example, for a constant energy/burst, if a pulse burst contains 10 individual laser pulses 500A, then each individual laser pulse 500A will contain less energy than if the same pulse burst 500 had only 2 individual laser pulses.

The use of a laser capable of generating such pulse bursts is advantageous for cutting or modifying transparent materials, for example glass. In contrast with the use of single pulses spaced apart in time by the repetition rate of the single-pulsed laser, the use of a pulse burst sequence that spreads the laser energy over a rapid sequence of pulses within the burst 500 allows access to larger timescales of high intensity interaction with the material than is possible with single-pulse lasers. While a single-pulse can be expanded in time, as this is done the intensity within the pulse must drop as roughly one over the pulse width. Hence if a 10 psec single pulse is expanded to a 10 nsec pulse, the intensity drop by roughly three orders of magnitude. Such a reduction can reduce the optical intensity to the point where non-linear absorption is no longer significant, and light material interaction is no longer strong enough to allow for cutting. In contrast, with a pulse burst laser, the intensity during each pulse 500A within the burst 500 can remain very high—for example three 10 psec pulses 500A spaced apart in time by approximately 10 nsec still allows the intensity within each pulse to be approximately three times higher than that of a single 10 psec pulse, while the laser is allowed to interact with the material over a timescale that is now three orders of magnitude larger. This adjustment of multiple pulses 500A within a burst thus allows manipulation of time-scale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of microcracks. The required amount of burst energy to modify the material will depend on the substrate material composition and the length of the line focus used to interact with the substrate. The longer the interaction region, the more the energy is spread out, and higher burst energy will be required. The exact timings, pulse durations, and burst repetition rates can vary depending on the laser design, but short pulses (<15 psec, or ≤10 psec) of high intensity have been shown to work well with this technique. A defect line or a hole is formed in the material when a single burst of pulses strikes essentially the same location on the glass. That is, multiple laser pulses within a single burst correspond to a single defect line or a hole location in the glass. Of course, since the glass is translated (for example by a constantly moving stage) (or the beam is moved relative to the glass, the individual pulses within the burst cannot be at exactly the same spatial location on the glass. However, they are well within 1 μm of one another-i. e., they strike the glass at essentially the same location. For example, they may strike the glass at a spacing, sp, from one another where 0<sp≤500 nm. For example, when a glass location is hit with a burst of 20 pulses the individual pulses within the burst strike the glass within 250 nm of each other. Thus, in some embodiments 1 nm<sp<250 nm. In some embodiments 1 nm<sp<100 nm.

Multi-photon effects, or multi-photon absorption (MPA) is the simultaneous absorption of two or more photons of identical or different frequencies in order to excite a molecule from one state (usually the ground state) to a higher energy electronic state (ionization). The energy difference between the involved lower and upper states of the molecule can be equal to the sum of the energies of the two photons. MPA, also called induced absorption, can be can be a second-order, third-order process, or higher-order process, for example, that is several orders of magnitude weaker than linear absorption. MPA differs from linear absorption in that the strength of induced absorption can be proportional to the square or cube (or higher power law) of the light intensity, for example, instead of being proportional to the light intensity itself. Thus, MPA is a nonlinear optical process.

The lateral spacing (pitch) between the defect lines (damage tracks) is determined by the pulse rate of the laser as the substrate is translated underneath the focused laser beam. Only a single picosecond laser pulse burst is usually necessary to form an entire hole, but multiple bursts may be used if desired. To form damage tracks (defect lines) at different pitches, the laser can be triggered to fire at longer or shorter intervals. For cutting operations, the laser triggering generally is synchronized with the stage driven motion of the workpiece beneath the beam, so laser pulse bursts are triggered at a fixed spacing, such as for example every 1 micron, or every 5 microns. Distance, or periodicity, between adjacent perforations or defect lines along the direction of the fault line can be greater than 0.1 micron and less than or equal to about 20 microns in some embodiments, for example. For example, the spacing or periodicity between adjacent perforations or defect lines is between 0.5 and 15 microns, or between 3 and 10 microns, or between 0.5 micron and 3.0 microns. For example, in some embodiments the periodicity can be between 2 micron and 8 microns.

We discovered that using pulse burst lasers with certain volumetric pulse energy density ($\mu J/\mu m^3$) within the approximately cylindrical volume of the line focus re preferable to create the perforated contours in the glass. This can be achieved, for example, by utilizing pulse burst lasers, preferably with at least 2 pulses per burst and providing volumetric energy densities within the alkaline earth boro-aluminosilicate glasses (with low or no alkali) of about 0.005 $\mu J/\mu m^3$ or higher to ensure a damage track is formed, but less than 0.100 $\mu J/\mu m^3$ so as to not damage the glass too much, for example 0.005 $\mu J/\mu m^3$-0.100 $\mu J/\mu m^3$ Interior Contour Process FIG. 1 illustrates the problem to be solved. A part 22 is to be cut out of a glass sheet 20. To release the outer contour of a part, additional release lines can be cut in the larger glass sheet that extend any crack lines to the edges of the sheet, allowing the glass to break into sections which can be removed. However, for interior contours such as those needed for a home button on a phone, creating additional release lines would cut through the part of interest. Thus the interior hole or slot is "locked in place", and is difficult to remove. Even if the glass is high stress and crack propagate from perforation to perforation in the outer diameter of the hole or slot, the interior glass will not release, as the material will be too rigid and is held by compressional force.

One manner of releasing a larger hole is to first perforate the contour of the hole, and then follow up with a laser heating process, such as with a $CO_2$ laser, that heats up the inner glass piece until it softens and then is compliant enough to drop out. This works well for larger hole diameters and thinner materials. However, as the aspect ratio (thickness/diameter) of the glass plug gets very large, such methods have more difficulty. For example, with such methods, 10 mm diameter holes can be released from 0.7 mm thick glass, but <4 mm holes cannot always be released in the same glass thickness.

Figure 8C:
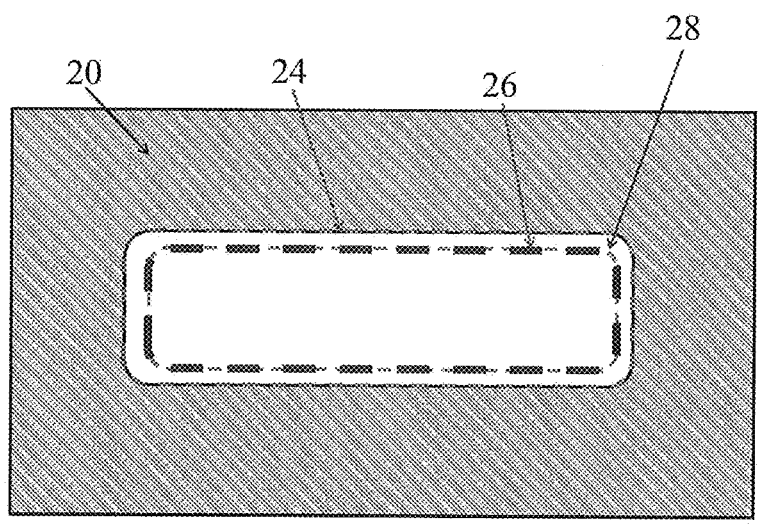
FIG. 8C is a description of different laser steps and paths traced out to define an inner contour and remove the material inside this contour.

FIG. 8C illustrates a process that solves this problem, and has been successfully used to separate holes down to 1.5 mm diameter out of 0.7 mm thick code 2320 glass (ion-exchanged and non-ion exchanged), and also to create slots with widths and radii as small as 1.5 mm. Step 1—A perforation of a first contour 24 is made in glass sheet 20 using the picosecond pulse burst process that defines the desired shape of the contour (e.g., hole, slot) to be cut. For example, for Corning's code 2320 0.7 mm thick non-ion exchanged glass, 210 μJ bursts were used to pitch to perforate the material and to create damage tracks or defect lines at 4 μm pitch. Depending on the exact material, other damage track spacings may also be employed, such as 1-15 microns, or 3-10 microns, or 3-7 microns. For ion-exchangeable glasses such as those described above, 3-7 micron pitch works well, but for other glasses such as the display glass Eagle XG, smaller pitches may be preferred, such a 1-3 microns. In the embodiments described herein, typical pulse burst laser powers are 10 W-150 Watts with laser powers of 25-60 Watts being sufficient (and optimum) for many glasses.

Step 2—A second perforation line 26 is formed to form a second contour inside of the first contour, using the same laser process, but approximately a few hundred microns inside the first contour. This step is optional, but is often preferred, as the extra perforation is designed to act as a thermal barrier and to promote the fragmentation and removal of material inside the hole when the next process step is employed.

Step 3—A highly focused $CO_2$ laser 28 is used to ablate the material inside the hole, by tracing out the approximate path defined by the second perforation contour described above, or slightly (100 µm) inside the 2nd contour. This will physically melt, ablate, and drive out the glass material inside of the hole or slot. For code 2320 0.7 mm thick non-ion exchanged glass available from Corning Incorporated, a $CO_2$ laser power of about 14 Watts with a focused spot size of about 100 µm diameter was used, and the $CO_2$ laser was translated around the path at a speed of about 0.35 m/min, executing 1-2 passes to completely remove the material, the number of passes begin dependent on the exact geometry of the hole or slot. In general, for this process step, the $CO_2$ beam would be defined as "focused" if it achieved a high enough intensity such that the glass material is melted and/or ablated by the high intensity. For example, the power density of the focused spot can be about 1750 $W/mm^2$, which would be accomplished with the above descrbed conditions, or could be from 500 $W/mm^2$ to 5000 $W/mm^2$, depending on the desired speed of traversal of the laser beam across the surface.

Figure 9:
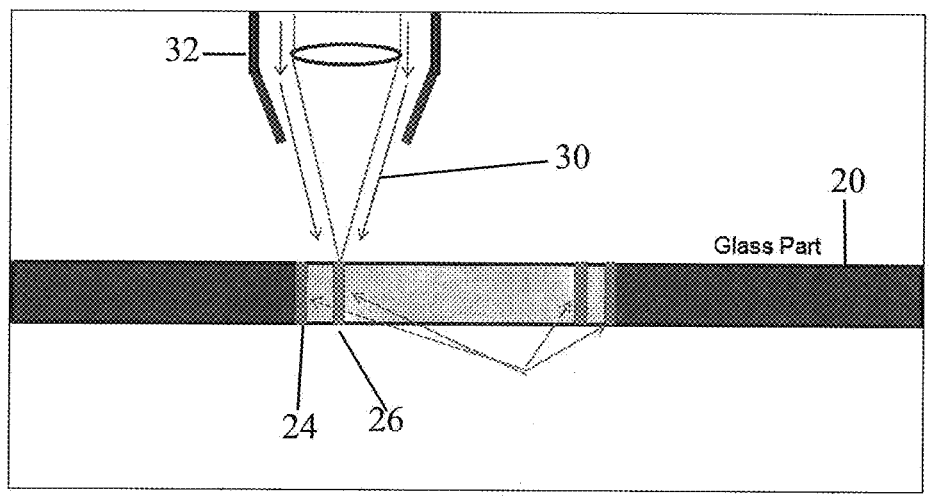
FIG. 9 is a description of the $CO_2$ laser step and path traced out to remove the material inside the contour.

In addition, as shown in FIG. 9, a highly velocity assist gas such as pressurized air or nitrogen is blown through a nozzle surrounding the $CO_2$ laser head 32. This blows a directed stream of gas at the focused $CO_2$ laser spot on the glass, and helps force the loosened glass material out of the larger substrate. Multiple passes of the $CO_2$ laser, at the same inner radius or slightly different inner radii may be used, depending on the resistance of the material to the forced removal. In the case of the above high pressure compressed air was forced through a about 1 mm nozzle using a pressure of 80 psi. The nozzle was positioned about 1mm above the glass substrate during the ablation, and the $CO_2$ beam was focused such that it passed without vignetting through the aperture of the nozzle.

FIG. 9 shows a side view of the above this process, to illustrate how the $CO_2$ ablation and air nozzle will create loosened material and force it out of the interior of the hole or slot.

Figure 10:
FIG. 10 is an example of a hole and slot cut and then separated from a 0.7 mm thick sample. The hole and slot were cut and removed using the process according to this invention.

Sample Results:

FIG. 10 shows the results of the process, for a cover glass for a typical handheld phone. The geometry of the oblong hole (home button) was about 5.2 mm by 16 mm, with about 1.5 mm radius corners, and for the slot, it was 15 mm long, 1.6 mm wide, with about 0.75 mm radii on the ends. Excellent edge quality (Ra of about 0.5 microns, no chipping observable under a 100× magnification microscope) and consistent material removal and separation were observed over >100 parts using this process.

Figure 11:
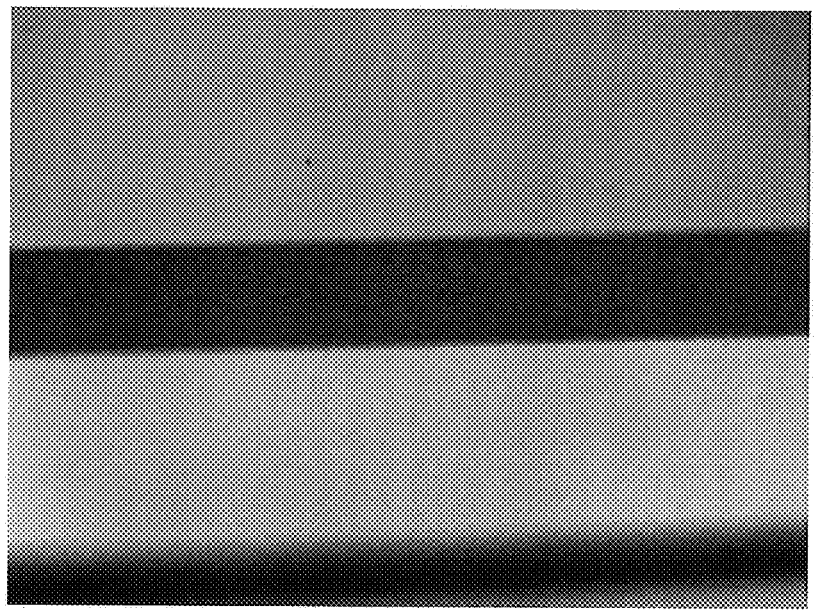
FIG. 11 is an angled image of the interior edge of a slot formed with the process described herein, after the $CO_2$ ablation process has been used to remove the interior material.
Figure 12:
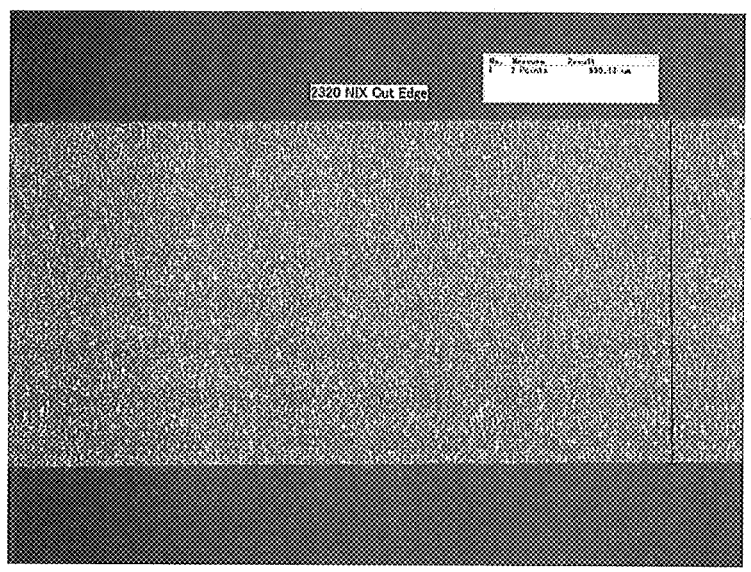
FIG. 12 is an edge image of a straight cut strip of 0.7 mm thick Corning 2320 NIOX (not ion exchanged) thick substrate, an exterior contour. This edge can be compared to the very similar edge shown in FIG. 11.

FIG. 11 shows an angled view of the interior edge. The edge shows the same textured damage track or filament structure achieved with outer contours made with the same damage track or filamentation process, which is shown for comparison in FIG. 12. This indicates that the $CO_2$ ablation process described above has removed the loosened interior material without damaging the high quality, low roughness, and low sub-surface edge which is generally created with the picosecond perforation process described above.

Figure 13:
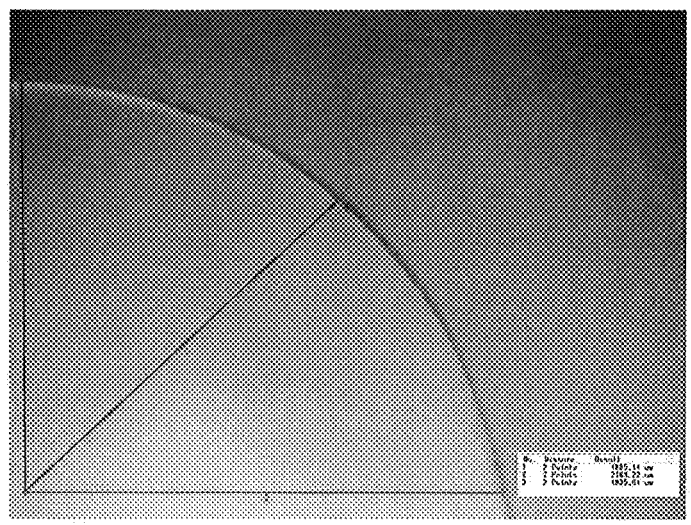
FIG. 13 is a top view of a cut edge of a slot made with the process described herein. No chipping or checking is observed on the edge of the contour. This contour has a radius of about 2 mm.

FIG. 13 shows a top view of the cut edge of a slot made with the process described. No chirping or checking is observed on the edge of the contour. This contour has a radius of about 2 mm.

As illustrated in FIGS. 14A-14C, the method to cut and separate transparent materials, and more specifically TFT glass compositions, is essentially based on creating a fault line 110 formed of a plurality of vertical defect lines 120 in the material or workpiece 130 to be processed with an ultra-short pulsed laser 140. The defect lines 120 extend, for example, through the thickness of the glass sheet, and are orthogonal to the major (flat) surfaces of the glass sheet. "Fault lines" are also referred to as "contours" herein. While fault lines or contours can be linear, like the fault line 110 illustrated in FIG. 14A, the fault lines or contours can also be nonlinear, having a curvature. Curved fault lines or contours can be produced by translating either the workpiece 130 or laser beam 140 with respect to the other in two dimensions instead of one dimension, for example. Depending on the material properties (absorption, CTE, stress, composition, etc.) and laser parameters chosen for processing the material 130, the creation of a fault line 110 alone can be enough to induce self-separation. In this case, no secondary separation processes, such as tension/bending forces or thermal stress created for example by a $CO_2$ laser, are necessary. As illustrated in FIG. 14A, a plurality of defect lines can define a contour. The separated edge or surface with the defect lines is defined by the contour. The induced absorption creating the defect lines can produce particles on the separated edge or surface with an average diameter of less than 3 microns, resulting in a very clean cutting process.

In some cases, the created fault line is not enough to separate the material spontaneously, and a secondary step may be necessary. While the perforated glass part may be placed in an chamber such as an oven to create a bulk heating or cooling of the glass part, to create thermal stress to separate the parts along the defect line, such a process can be slow and may require large ovens or chambers to accommodate many arts or large pieces or perforated glass. If so desired, a second laser can be used to create thermal stress to separate it, for example. In the case of TFT glass compositions, separation can be achieved, after the creation of a fault line, by application of mechanical force or by using a thermal source (e.g., an infrared laser, for example a $CO_2$ laser) to create thermal stress and force separation of the material. Another option is to have the $CO_2$ laser only start the separation and then finish the separation manually. The optional $CO_2$ laser separation is achieved, for example, with a defocused continuous wave (cw) laser emitting at 10.6 microns and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, CO2 laser spot sizes of 1 to 20 mm, for example 1 to 12 mm, 3 to 8 mm, or about 7 mm, 2 mm, and 20 mm can be used for $CO_2$ lasers, for example, with a $CO_2$ 10.6 µm wavelength laser. Other lasers, whose emission wavelength is also absorbed by the glass, may also be used, such as lasers with wavelengths emitting in the 9-11 micron range, for example. In such cases $CO_2$ laser with power levels between 100 and 400 Watts may be used, and the beam may be scanned at speeds of 50-500 mm/sec along or adjacent to the defect lines, which creates sufficient thermal stress to induce separation. The exact power levels, spot sizes, and scanning speeds chosen within the specified ranges may depend on the material use, its thickness, coefficient of thermal expansion (CTE), elastic modulus, since all of these factors influence the amount of thermal stress imparted by a specific rate of energy deposition at a given spatial location. If the spot size is too small (i.e. <1 mm), or the $CO_2$ laser power is too high (>400 W), or the scanning speed is too slow (less than 10 mm/sec), the glass may be over heated, creating ablation, melting or thermally generated cracks in the glass, which are undesirable, as they will reduce the edge strength of the separated parts. Preferably the $CO_2$ laser beam scanning speed is >50 mm/sec, in order to induce efficient and reliable part separation. However, if the spot size created by the $CO_2$ laser is too large (>20 mm), or the laser power is too low (<10 W, or in some cases <30 W), or the scanning speed is too high (>500 mm/sec), insufficient heating occurs which results in too low a thermal stress to induce reliable part separation.

For example, in some embodiments, a $CO_2$ laser power of 200 Watts may be used, with a spot diameter at the glass surface of approximately 6 mm, and a scanning speed of 250 mm/sec to induce part separation for 0.7 mm thick Corning Eagle XG® glass that has been perforated with the above mentioned psec laser. For example a thicker Corning Eagle XG® glass substrate may require more $CO_2$ laser thermal energy per unit time to separate than a thinner Eagle XG® substrate, or a glass with a lower CTE may require more $CO_2$ laser thermal energy to separate than a glass with a lower CTE. Separation along the perforated line will occur very quickly (less than 1 second) after $CO_2$ spot passes a given location, for example within 100 milliseconds, within 50 milliseconds, or within 25 milliseconds.

Distance, or periodicity, between adjacent defect lines 120 along the direction of the fault lines 110 can be greater than 0.1 micron and less than or equal to about 20 microns in some embodiments, for example. For example, in some embodiments, the periodicity between adjacent defect lines 120 may be between 0.5 and 15 microns, or between 3 and 10 microns, or between 0.5 micron and 3.0 microns. For example, in some embodiments the periodicity between adjacent defect lines 120 can be between 0.5 micron and 1.0 micron.

There are several methods to create the defect line. The optical method of forming the line focus can take multiple forms, using donut shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached to create breakdown of the substrate material in the region of focus to create breakdown of the substrate material or glass workpiece, through nonlinear optical effects. Preferably, the laser is a pulse burst laser which allows for control of the energy deposition with time by adjusting the number of pulses within a given burst.

In the present application, an ultra-short pulsed laser is used to create a high aspect ratio vertical defect line in a consistent, controllable and repeatable manner. The details of the optical setup that enables the creation of this vertical defect line are described below, and in U.S. Application No. 61/752,489 filed on Jan. 15, 2013, the entire contents of which are incorporated by reference as if fully set forth herein. The essence of this concept is to use optics to create a line focus of a high intensity laser beam within a transparent part. One version of this concept is to use an axicon lens element in an optical lens assembly to create a region of high aspect ratio, taper-free microchannels using ultra-short (picoseconds or femtosecond duration) Bessel beams.

In other words, the axicon condenses the laser beam into a high intensity region of cylindrical shape and high aspect ratio (long length and small diameter). Due to the high intensity created with the condensed laser beam, nonlinear interaction of the electromagnetic field of the laser and the substrate material occurs and the laser energy is transferred to the substrate to effect formation of defects that become constituents of the fault line. However, it is important to realize that in the areas of the material where the laser energy intensity is not high (e.g., glass volume of substrate surrounding the central convergence line), the material is transparent to the laser and there is no mechanism for transferring energy from the laser to the material. As a result, nothing happens to the glass or workpiece when the laser intensity is below the nonlinear threshold.

The methods described above provide the following benefits that may translate to enhanced laser processing capabilities and cost savings and thus lower cost manufacturing. The cutting process offers:

1) Full separation of interior contours being cut: the methods described above are capable of completely separating/cutting holes and slots in a clean and controlled fashion in ion-exchangeable glass (such as Gorilla® glass, Corning glass codes 2318, 2319, 2320 or the like) as produced by the fusion draw process, or other glass forming processes, before the glass part has undergone chemical strengthening.

2) Separation of holes/slots with very small dimensions: Other processes may be used to heat and induce softening of a glass plug which can allow it to drop out of a glass sheet. However, as the aspect ratio (thickness/diameter) of the glass plug gets very large, such methods fail. For example, heating (not ablation) of the interior glass plug will drop out 10 mm diameter holes out of 0.7 mm thick glass, but if the diameter of the hole is reduced to 4 mm, such processes will not work. However, the process disclosed here has been used to remove glass plugs that have dimensions as small as 1.5 mm (diameter of a circle, or width of a slot) in 0.7 mm thick glass.

3) Reduced subsurface defects and excellent edge quality: Due to the ultra-short pulse interaction between laser and material, there is little thermal interaction and thus a minimal heat affected zone that can result in undesirable stress and micro-cracking. In addition, the optics that condense the laser beam into the glass creates defect lines that are typically 2 to 5 microns diameter on the surface of the part. After separation, the subsurface damage is <75 μm, and can be adjusted to be <25 μm. The roughness of the separated surface (or cut edge), results particularly from the spot size or the spot diameter of the focal line. A roughness of the separated (cut) surface which can be, for example, 0.1 to 1 microns or for example 0.25 to 1 microns), can be characterized, for example, by an Ra surface roughness statistic (roughness arithmetic average of absolute values of the heights of the sampled surface, which include the heights of bumps resulting from the spot diameter of the focal line). The surface roughness generated by this process is often <0.5 μm (Ra), and can be as low as 0.1 μm (Ra). This has great impact on the edge strength of the part as strength is governed by the number of defects, their statistical distribution in terms of size and depth. The higher these numbers are the weaker the edges of the part will be. In addition, if any mechanical finishing processes such as grinding and polishing are later used to modify the edge shape, the amount of material removal required will be lower for parts with less sub-surface damage. This reduces or eliminates finishing steps, lower part cost. The hole and slot release process described here takes full advantage of the high-quality edge created by this line-focus picosecond laser perforation process—it ensures that the removal of the interior glass material is done in a manner that cleanly releases the glass along this perforation line, and does not induce ablative damage, micro-cracking, or other defects to the desired part edge.

Speed: Unlike processes which use focused laser to purely ablate the material around the inner contour, this laser process is a single pass process for the perforation line. The perforated hole contour may be created by the picosecond laser process described herein at speeds of 80-1000 mm/sec, depending only on the acceleration capabilities of the stages involved. This is in contrast to ablative hole and slot drilling methods, where material is removed "layer by layer" and requires many passes or long residence times per location of the laser beam.

Process cleanliness: the methods described above are capable of separating/cutting glass or other transparent brittle materials in a clean and controlled fashion. It is very challenging to use conventional ablative or thermal laser processes because they tend to trigger heat affected zones that induce micro-cracks and fragmentation of the glass into several smaller pieces. The characteristics of the laser pulses and the induced interactions with the material of the disclosed method avoid all of these issues because they occur in a very short time scale and the material transparency to the laser radiation minimizes the induced thermal effects. Since the defect line is created within the object, the presence of debris and adhered particles during the cutting step is virtually eliminated. If there are any particulates resulting from the created defect line, they are well contained until the part is separated.

Cutting Complex Profiles and Shapes in Different Sizes

The methods described above enable cutting/separation of glass and other substrates following many forms and shapes, which is a limitation in other competing technologies. Tight radii may be cut (<2 mm), allowing creation of small holes and slots (such as required for speakers/microphone in a cell phone application). Also, since the defect lines strongly control the location of any crack propagation, those method give great control to the spatial location of a cut, and allow for cut and separation of structures and features as small as a few hundred microns.

Elimination of Process Steps

The process to fabricate glass plates from the incoming glass panel to the final size and shape involves several steps that encompass cutting the panel, cutting to size, finishing and edge shaping, thinning the parts down to their target thickness, polishing, and even chemically strengthening in some cases. Elimination of any of these steps will improve manufacturing cost in terms of process time and capital expense. The methods described above may reduce the number of steps by, for example:

Reduced debris and edge defects generation—potential elimination of washing and drying stations Cutting the sample directly to its final size, shape and thickness—eliminating need for finishing lines.

Thus, according to some embodiments, a glass article has at least one inner contour edge with plurality of defect lines extending perpendicular to the face of the glass sheet at least 250 μm, the defect lines each having a diameter less than or equal to about 5 μm. For example, a glass article has at least one inner contour edge having a plurality of defect lines extending perpendicular to the major (i.e., large relative to the sides) flat face of the glass sheet at least 250 μm, the defect lines each having a diameter less than or equal to about 5 μm. In some embodiments, the smallest dimension or width of the interior contour defined by the inner contour edge is less than 5 mm, for example it may be 0.1 mm to 3 mm in width (or diameter), e.g, 0.5 mm to 2 mm. According to some embodiments, the glass article comprises post-ion exchange glass. According to some embodiments, the defect lines extend the full thickness of the at least one inner contour edge. According to at least some embodiments, the at least one inner contour edge has an Ra surface roughness less than about 0.5 μm. According to at least some embodiments, the at least one inner contour edge has subsurface damage up to a depth less than or equal to about 75 μm. In at least some embodiments, of the glass article the defect lines extend the full thickness of the edge. The distance between the defect lines is, for example, less than or equal to about 7 μm.

The relevant teachings of all patents, published applications and references cited herein are incorporated by reference in their entirety.

While exemplary embodiments have been disclosed herein, it will be understood by those skilled in the art that various changes in form and details may be made therein without departing from the scope of the invention encompassed by the appended claims.

What is claimed is:

1. A method of forming a glass article, comprising:
   I. focusing a pulsed first laser beam into a laser beam focal line;
   II. directing the laser beam focal line into a glass substrate at a plurality of locations along a closed inner contour defining an inner glass piece, the laser beam focal line generating an induced absorption within the glass substrate such that the laser beam focal line produces a defect line extending through a thickness of the glass substrate at each location of the plurality of locations;
   III. heating the glass substrate, thereby inducing a stress in the glass substrate that separates the inner glass piece from the glass substrate along the closed inner contour; and
   IV. heating the inner glass piece after the separation with a second laser beam such that the inner glass piece softens and drops from the glass substrate.

2. The method according to claim 1, wherein step III comprises heating the glass substrate in a heating chamber.

3. The method according to claim 1, wherein step III comprises tracing an infrared third laser beam over the closed inner contour.

4. The method according to claim 3, wherein a wavelength of the infrared third laser beam is in a range from about 9 micrometers to about 11 micrometers.

5. The method according to claim 4 wherein the infrared third laser beam is a defocused laser beam.

6. The method according to claim 5, wherein the infrared third laser beam is a $CO_2$ laser beam.

7. The method according to claim 1, wherein a spacing between adjacent defect lines of the first plurality of defect lines is in a range from about 0.1 micrometer to about 15 micrometers.

8. The method according to claim 1, wherein the closed inner contour is a circle.

9. The method according to claim 1, further comprising cutting release lines between an edge of the glass substrate and an outer contour outside the inner contour.

10. The method according to claim 1, wherein a surface roughness $R_a$ of a cut edge of the glass substrate along the inner contour is less than about 0.5 micrometers.

11. The method according to claim 10, wherein subsurface damage perpendicular to the cut edge extends less than 75 micrometers into the glass substrate.

12. The method according to claim 1, wherein the subsurface damage is less than about 25 micrometers.

13. The method according to claim 1, wherein the plurality of defect lines extend perpendicular to the major surfaces of the glass substrate.

14. The method according to claim 1, wherein the pulsed first laser beam is focused by a focusing lens and the pulsed first laser beam irradiates the focusing lens in the form of an annulus.

15. A method of forming a glass article, comprising:
   I. focusing a pulsed first laser beam into a laser beam focal line;
   II. directing the laser beam focal line into a glass substrate at a plurality of locations along a closed inner contour defining an inner glass piece, the laser beam focal line generating an induced absorption within the glass substrate such that the laser beam focal line produces a defect line extending through a thickness of the glass substrate at each location of the plurality of locations;
   III. tracing a defocused infrared laser beam over the closed inner contour, thereby inducing a stress in the glass substrate that separates the inner glass piece from the glass substrate; and
   IV. heating the inner glass piece after the separation with a $CO_2$ laser beam such that the inner glass piece softens and drops from the glass substrate.

16. The method according to claim 15, wherein a wavelength of the defocused laser beam is in a range from about 9 micrometers to about 11 micrometers.

17. The method according to claim 15, wherein a spacing between adjacent defect lines of the first plurality of defect lines is in a range from about 0.1 micrometer to about 15 micrometers.

18. The method according to claim 15, wherein the pulsed first laser beam is focused by a focusing lens and the pulsed first laser beam irradiates the focusing lens in the form of an annulus.

* * * * *

UNITED STATES PATENT AND TRADEMARK OFFICE
CERTIFICATE OF CORRECTION

PATENT NO. : 10,233,112 B2
APPLICATION NO. : 15/251605
DATED : March 19, 2019
INVENTOR(S) : Thomas Hackert et al.

It is certified that error appears in the above-identified patent and that said Letters Patent is hereby corrected as shown below:

On the Title Page

On the page 5, in Column 2, item (56), other publications, Line 31, delete "Transistions" and insert -- Transitions --, therefor.

On the page 5, in Column 2, item (56), other publications, Line 53, delete "Intellecutal" and insert -- Intellectual --, therefor.

On the page 6, in Column 1, item (56), other publications, Line 30, delete "551-654;" and insert -- 651-654; --, therefor.

On the page 6, in Column 2, item (56), other publications, Lines 51-52, delete "Eelectropolishing;" and insert -- Electropolishing; --, therefor.

In the Claims

In Column 20, Line 55, Claim 5, delete "claim 4" and insert -- claim 4, --, therefor.

Signed and Sealed this
Twenty-seventh Day of August, 2019

Andrei Iancu
*Director of the United States Patent and Trademark Office*